United States Patent
Wicks et al.

(10) Patent No.: US 9,612,332 B2
(45) Date of Patent: Apr. 4, 2017

(54) CALIBRATION METHOD FOR TRIGONOMETRIC-BASED RANGING SYSTEMS IN MULTIPLE MEDIA

(71) Applicant: 2G Robotics Inc., Waterloo (CA)

(72) Inventors: Ryan Wicks, Waterloo (CA); Jason Gillham, Kitchener (CA); Shawn Satchell, New Hamburg (CA)

(73) Assignee: 2G Robotics Inc., Waterloo, ON (CA)

( * ) Notice: Subject to any disclaimer, the term of this patent is extended or adjusted under 35 U.S.C. 154(b) by 492 days.

(21) Appl. No.: 14/136,291

(22) Filed: Dec. 20, 2013

(65) Prior Publication Data

US 2014/0174149 A1 Jun. 26, 2014

Related U.S. Application Data

(60) Provisional application No. 61/740,967, filed on Dec. 21, 2012.

(51) Int. Cl.
*G01S 17/48* (2006.01)
*G01S 17/89* (2006.01)
(Continued)

(52) U.S. Cl.
CPC .......... *G01S 17/48* (2013.01); *G01B 11/2504* (2013.01); *G01B 11/2513* (2013.01); *G01S 7/4972* (2013.01); *G01S 17/89* (2013.01)

(58) Field of Classification Search
CPC . G01B 11/24; G01B 11/2504; G01B 11/2513; G01S 17/48; G01S 17/89; G01S 7/4972
See application file for complete search history.

(56) References Cited

U.S. PATENT DOCUMENTS 8,366,001 B2   2/2013   Craen et al.
8,542,413 B2   9/2013   Gillham et al.
(Continued)

FOREIGN PATENT DOCUMENTS

JP   2013218111 A   * 10/2013
WO   2008005707 A1   1/2008

OTHER PUBLICATIONS

Moore, Karl D. "Intercalibration method for underwater three-dimensional mapping laser line scan systems", Applied Optics, vol. 40, Issue 33, pp. 5991-6004, 2001.
(Continued)

*Primary Examiner* — Francis Gray

(57) ABSTRACT

A method of calibrating a trigonometric-based ranging system in first and second transmissive media including, in each of the first and second media, determining a sensor matrix for a sensor of the system therein. Rotation and translation of a sensor axis of the sensor is measured relative to an ideal sensor axis, by determining the rotation and translation of a sensor co-ordinate system of the sensor in each of the first and second media concurrently, to provide a rotation/translation matrix for a field of view of the sensor in each of the first and second media. Rotation of a device axis of a structured signal-emitting device relative to an ideal device axis is measured by determining a relative change in the structured signal in the first medium and in the second medium, to generate a device rotation matrix to be applied to the structured signal.

10 Claims, 19 Drawing Sheets

(51) Int. Cl.
*G01S 7/497* (2006.01)
*G01B 11/25* (2006.01)

(56) References Cited

U.S. PATENT DOCUMENTS

| | | | | |
|---|---|---|---|---|
| 2002/0089673 A1* | 7/2002 | Lilienblum | ........... | G01B 11/024 356/602 |
| 2010/0079598 A1* | 4/2010 | Ke | ........... | G01B 11/24 348/187 |
| 2012/0062963 A1* | 3/2012 | Gillham | ........... | B63C 11/48 358/474 |

OTHER PUBLICATIONS

Forest, Josep, et al. "Image ranging system for underwater applications", IFAC Preprints. 5th IFAC Conference on Maneuvering and Control of Marine Craft, pp. 153-158, Aug. 23-25, 2000.

Zang, Zhengyou. "Flexible Camera Calibration by Viewing a Plane From Unknown Orientations", Proceedings of the International Conference on Computer Vision (ICCV'99), pp. 666-673, IEEE 0-7695-0164-8/99, Kerkyra, Greece, Sep. 20-27, 1999.

* cited by examiner

CALIBRATION METHOD FOR TRIGONOMETRIC-BASED RANGING SYSTEMS IN MULTIPLE MEDIA

This application claims the benefit of U.S. Provisional Application No. 61/740,967, filed on Dec. 21, 2012, and incorporates such provisional patent application in its entirety by reference.

FIELD OF THE INVENTION

The present invention is a method of calibrating a trigonometric-based ranging system in multiple media.

BACKGROUND OF THE INVENTION

As is well known in the art, trigonometric-based ranging systems are used to obtain data describing the shape of a target object. Conventionally, such system may include one or more structured signal-emitting devices, and one or more optical sensors for sensing the structured signals. A structured signal-emitting assembly includes the structured signal-emitting device(s), and one or more housings fitted with viewports or windows in which the structured signal-emitting device is mounted. Also, a sensor assembly includes the optical sensor(s) and one or more housings fitted with viewports or windows.

Typically, the structured signal is directed to a point, or a number of points, on the target object. If the point or number of points are within a field of view of the sensor, then the position(s) of the point(s) is (are) sensed by the sensor. The location of the sensor relative to the structured signal-emitting device, i.e., their geometric relationship, is known in air, because it can be measured. Conventionally, and as is well known in the art, the geometric relationship is determined in air. The location of the structured signal's intersection with the target object in the sensor's field of view, with the known information regarding the positioning of the structured signal-emitting device and the sensor relative to each other, enables the determination of the location of such intersection. Depending on the structured signal, its intersection with the target object may be in the form of a point or a number of points, e.g., a plane. Based on the measured geometry (i.e., the geometric relationship) between the sensor and the signal-emitting device and the angular transmission and collection properties of the devices in the operating medium, distance measurements are obtained. A large amount of data may be obtained, to result in a 3D cloud, for providing a very accurate image or model of the target object.

For the purposes hereof, a structured signal is considered to be a probe signal with a well-known physical structure that can be used to investigate the layout of an unknown scene (e.g., a target object) by measuring how the structured signal is affected by the scene. An example of a structured signal-emitting device is a laser light plane generator. Where the structured signal is a laser light plane, the optical imaging sensor may be, for example, a charge-coupled device ("CCD") or an image sensor produced by CMOS (i.e., a CMOS sensor). As is well known in the art, various types of optical imaging sensors may be used, depending on the structured signals that are generated.

To generate data that describes at least a preselected portion of the target object, the structured signal-emitting device and the sensor are movable relative to the target object, or vice versa. For example, the structured signal-emitting assembly and the sensor assembly typically are mounted on a vehicle, above a moving platform (e.g., a conveyor or a rotary stage), or on a rotating frame. The ranging system is then moved relative to the target object or vice versa, and a 3D point cloud is then generated, utilizing a processor. The point cloud is a high resolution, 3D representation of the target object that was scanned. Such systems may be used, for example, for engineering inspections, archeological investigations, and survey work.

A typical trigonometric-based ranging system 10 is schematically illustrated in FIG. 1. As can be seen in FIG. 1, a conventional structured signal-emitting assembly 12 includes a structured signal-emitting device 14 mounted inside a first housing 16 in which a first viewport 18 is positioned. One or more structured signals are emitted from the structured signal-emitting device 12 and transmitted through the first viewport 18 toward a target object 20, as schematically indicated by the reference numeral 21 in FIG. 1. The direction of the transmission is shown in FIG. 1 by arrow "A". To simplify the illustration, in FIG. 1, the structured signal 21 is shown as intersecting with the target object 20 at a point "P". As can be seen in FIG. 1, a conventional sensor assembly 22 includes a sensor 24 mounted in a second housing 26 in which a second viewport 28 is positioned. As illustrated in FIG. 1, the point "P" is within a field of view ("FOV") defined by limits schematically illustrated in FIG. 1 and identified as "$L_1$" and "$L_2$". It will be understood that the FOV is three-dimensional, centered around an optical axis of the sensor.

The geometric relationship of the structured signal-emitting device 14 and the sensor 24, although defined in three dimensions, can be understood based on FIG. 1. A baseline distance 30 is defined by a straight line or baseline 32 between the structured signal-emitting device 14 and the sensor 24. The sensor 24 and the device 14 each substantially define respective optical axes 34, 36 thereof (It will be understood that the optical axes 34, 36 are not necessarily in the same plane, although they are illustrated in only two dimensions in FIG. 1.) The angles $\alpha$ and $\beta$, defined between the optical axis 34 and the baseline 32, and between the optical axis 36 and the baseline 32 respectively, also partly define the geometric relationship between the sensor 24 and the structured signal-emitting device 14. Conventionally, the geometric relationship is determined in air.

As noted above, if the point "P" on the target object 20 is within the FOV of the sensor 24, the structured signal 21 is sensed through the second viewport 28 by the sensor 22. The data thus obtained is processed by a suitable processor (not shown in FIG. 1) to determine the location of the point "P" relative to a coordinate system of the system 10. Typically, data for a large number of points is collected, in order to provide sufficient information to describe the target object 20.

Generally, a trigonometric-based ranging system's data collection properties can vary depending on the medium in which it is operating, thus impacting the ability of the device to accurately interpret the angle at which the signal is being received, i.e., impacting the perceived location of the point "P" in the sensor's field of view. In the prior art, calibration in the environment of operation is required to understand the angular behaviour of the sensor in that environment. As is well known in the art, this angular variation of the receiver is the result of the signals propagating through one environment (optical medium) at a different speed than within another environment (another optical medium).

Accordingly, trigonometric-based ranging systems designed for distance measuring and/or 2D/3D point cloud generation are conventionally calibrated in the optical medium in which they are to be operated. For instance, the trigonometric-based ranging system may be operated in air (i.e., with the target, the structured signal-emitting assembly, and the sensor assembly all located in ambient air), or in water (i.e., with the target, the structured signal-emitting assembly, and the sensor assembly all immersed in water), or in another optical medium. If a trigonometric-based ranging system is to be operated in different optical media (for instance, air and water), separate calibrations of the full system are conventionally required for each of these two sets of calibration properties. For example, a trigonometric-based ranging system intended for use underwater would conventionally be completely immersed for calibration underwater, in a water tank or a pool.

As is well known in the art, the differences between operating in different optical media arise because of refraction at the viewport/optical media interface. Due to refraction, the apparent geometric relationship of the structured signal-emitting device and the sensor is not the same underwater as the measured geometric relationship, i.e., as measured in air. The conventional solution to this problem is to calibrate the entire system in water and in air, e.g., to calibrate in air, and also to immerse the entire system in water in order to determine the apparent geometric relationship in water.

For the purposes of the following discussion, it is understood that the structured signal is a plane of laser light.

In summary, it can be seen that the calibration of the trigonometric-based laser ranging system typically involves two distinct steps: first, determining the optical properties of the sensor and the laser emitter, and determining the spatial relationship between the laser emitter and the sensor. The first of these two steps, the camera calibration, produces a camera matrix based on a pinhole camera model that maps 2D camera sensor positions into 3D unit vectors measured relative to an idealized pinhole (i.e., the principle point of the camera/sensor). See, for instance, Zhang, Zhengyou, "Flexible camera calibration by viewing a plane from unknown orientations", Proceedings of the International Conference on Computer Vision (ICCV'99), pp. 666-673, IEEE 0-7695-0164-8/99, Kerkyra, Greece, Sep. 20-27, 1999. The second step of the conventional laser scanner calibration process measures the position (i.e., the geometric relationship, apparent and otherwise) of the actual laser light plane in physical units relative to the camera/sensor principle point, in each optical medium of interest.

The first step of the conventional calibration process is specific to the camera alone, but the second step is dependent on the relative position and orientation of the sensor and the laser plane.

This methodology can be extended to other signal and sensor types in that the first stage of calibration is determining, for a particular medium, what the angular model (i.e., the configuration of the field of view) of the sensor is. In the second step, based on this angular model, measurements are made to determine the geometric relationship (apparent and otherwise) between the sensor and the structured signal-emitting device, in each optical medium of interest.

However, the prior art methods have some disadvantages. For instance, in some situations, it is not practical to calibrate a system in its intended operating environment (e.g., both in air and in water), due to cost or safety constraints. That is, calibration of the entire system in water may be difficult, for example, if the system is relatively large. Furthermore, repairs or replacements of individual components of the system normally require a full system re-calibration, i.e., in each optical medium of interest.

SUMMARY OF THE INVENTION

For the foregoing reasons, there is a need for a method of calibrating trigonometric-based ranging systems that overcomes or mitigates one or more of the defects of the prior art.

The present invention allows one to calibrate such a system in air, and to convert this calibration to one appropriate for underwater use by measuring properties of the sensor and laser assemblies underwater separately. Furthermore, this method allows individual components of a system to be replaced, without requiring a full system re-calibration.

In its broad aspect, the invention provides a method of calibrating a trigonometric-based ranging system in air and water, the trigonometric-based ranging system including a structured signal-emitting device for emitting a structured signal and a sensor having a field of view for sensing signals emitted by the structured signal-emitting device. The structured signal-emitting device and the sensor also have a geometric relationship measured in air. The method includes in each of air and water, determining a sensor matrix for the sensor therein respectively. Rotation and translation of a sensor optical axis of the sensor are measured relative to an ideal sensor optical axis substantially defined by a sensor housing in which the sensor is mounted, by determining the rotation and translation of a sensor co-ordinate system of the sensor in each of air and water concurrently, to provide a rotation/translation matrix for the field of view in each of air and water respectively. Rotation of a device optical axis of the device is measured relative to an ideal device optical axis substantially defined by a device housing in which the device is mounted, by determining a relative change in an angle of the structured signal, between the structured signal in air and the structured signal in water respectively, to generate a device rotation matrix to be applied to the structured signal.

In another aspect, the method includes applying the rotation/translation matrix to the structured signal, and applying the device rotation matrix to the structured signal, to determine an apparent geometric relationship of the structured signal-emitting device and the sensor in water.

In yet another aspect, the invention provides measuring rotation and translation of a new sensor optical axis of a new sensor relative to an ideal new sensor optical axis substantially defined by a new sensor housing in which the new sensor is mounted, by determining the rotation and translation of a new sensor co-ordinate system of the new sensor in each of air and water concurrently, to provide a new rotation/translation matrix for the new sensor in each of air and water respectively. One or more differences between the rotation/translation matrix and the new rotation/translation matrix are determined. The rotation/translation matrix is rotated and translated by the difference, to adjust the rotation/translation matrix for one or more discrepancies between non-idealities associated with the sensor and the sensor housing, and new non-idealities associated with the new sensor and the new sensor housing, to provide a new rotation/translation matrix for the new sensor's field of view in air and water respectively.

In another of its aspects, the invention provides measuring rotation of a new device optical axis of a new device generating a new structured signal relative to an ideal new device optical axis substantially defined by a new device housing in which the new device is mounted, by determining a new relative change in an angle of the new structured signal between air and water. One or more differences are determined between the relative change and the new relative change. The new optical axis of the new device is rotated by the device difference, to adjust the device rotation matrix for one or more discrepancies between non-idealities associated with the device and the device housing and new non-idealities associated with the new device and the new device housing respectively, to generate a new rotation matrix to be applied to the new structured signal.

In another of its aspects, the invention provides a method of calibrating a trigonometric-based ranging system including a structured signal-emitting assembly with a device for emitting one or more structured signals mounted in a device housing, the device housing substantially defining an ideal device axis. The trigonometric-based ranging system also includes a sensor assembly with a sensor having one or more fields of view in which the structured signal is detectable by the sensor, the sensor being mounted in a sensor housing, the sensor housing substantially defining an ideal sensor axis. The structured signal-emitting device and the sensor also have a geometric relationship measured in a first medium. The method includes transmitting the structured signal from the device via the first medium toward one or more points on a target object, and determining a first sensor matrix associated with the first medium upon the sensor sensing the structured signal at the point through the first medium. The structured signal is transmitted from the device via a second medium toward one or more locations on the target object, and a second camera matrix associated with the second medium is determined upon the sensor sensing the structured signal at the location through the second medium. Rotation and translation of a sensor axis of the sensor are measured relative to the ideal sensor axis by measuring the rotation and translation of a sensor co-ordinate system thereof in each of the first medium and the second medium, to provide a rotation/translation matrix for the field of view to adjust for non-idealities in the sensor assembly. Rotation of a device axis of the device is measured relative to the ideal device axis by measuring a relative change in an angle between a plane defined by the structured signal, between the structured signal in the first medium and the structured signal in the second medium respectively, to generate a device rotation matrix to be applied to the structured signal to adjust for non-idealities in the structured signal-emitting assembly.

In yet another aspect, the invention includes applying the rotation/translation matrix to said at least one structured signal, and applying the device rotation matrix to said at least one structured signal, to determine an apparent geometric relationship of the structured signal-emitting device and the sensor in the second medium.

In another of its aspects, the invention includes measuring rotation and translation of a new sensor axis of a new sensor relative to an ideal new sensor axis substantially defined by a new sensor housing in which the new sensor is mounted, by determining the rotation and translation of a new sensor co-ordinate system of the new sensor in each of the first and the second media concurrently, to provide a new rotation/translation matrix for a new field of view of the new sensor in each of the first and the second media respectively, and determining one or more differences between the rotation/translation matrix and the new rotation/translation matrix. The rotation/translation matrix is rotated and translated by the difference, to adjust the rotation/translation matrix for one or more discrepancies between non-idealities associated with the sensor and the sensor housing, and new non-idealities associated with the new sensor and the new sensor housing, to provide a new rotation/translation matrix for the new sensor's field of view in the first and the second media respectively.

In another aspect, the invention includes measuring rotation of a new device axis of a new device relative to an ideal new device axis substantially defined by a new device housing in which the new device is mounted, by determining a new relative change in an angle of the new structured signal between the first and the second media, the new device generating a new structured signal, determining one or more device differences between the relative change and the new relative change, and rotating the new axis of the new device by the device difference, to adjust the device rotation matrix for one or more discrepancies between non-idealities associated with the device and the device housing and new non-idealities associated with the new device and the new device housing, to generate a new rotation matrix to be applied to the new structured signal.

In yet another aspect, the structured signal-emitting assembly is positioned at an interface between the first medium and the structured signal is substantially normal to the interface, the structured signal being directed toward a substantially planar surface positioned substantially normal to the interface and located at a predetermined distance from the device, to generate the device rotation matrix.

In another aspect, the invention provides a method of determining rotation and translation of a co-ordinate system defined by a sensor of a trigonometric-based ranging system, the sensor being positioned in a sensor housing, the sensor housing including a sensor viewport through which a structured signal is transmitted to the sensor, the sensor housing substantially defining an ideal axis. The method includes concurrently measuring a fixed symmetric target of known geometry in a first medium and in a second medium to determine apparent differences between the target in the first medium and the target in the second medium, and determining, based on the apparent differences, rotation and translation of a co-ordinate system defined by the sensor in moving the sensor from the first medium to the second medium to provide a rotation/translation matrix applicable to the structured signal.

In yet another aspect, the fixed symmetric target is observed simultaneously by the sensor in each of the first medium and the second medium.

In another of its aspects, the sensor assembly is positioned at an interface between the first medium and the second medium, with the interface substantially bisecting the sensor viewport.

In another aspect, the fixed symmetric target includes a substantially planar surface facing the sensor, the known geometry of the fixed symmetric target includes a pattern symmetrically divided at a plane of symmetry, and the plane of symmetry is located substantially at the interface.

In another of its aspects, the invention provides a method of measuring an actual angular deflection of one or more structured signals due to refraction resulting from one or more non-idealities in a position of a structured signal-emitting device in a device housing, the device housing including a viewport with substantially parallel planar surfaces thereof through which said at least one structured signal is emitted. The method includes positioning the structured signal-emitting device at an interface between a first medium and a second medium so that the interface substantially bisects the viewport and the structured signal is substantially normal to the interface, positioning a substantially planar surface defining a target plane at the interface at a predetermined distance apart from the viewport, the surface being substantially normal to the interface, emitting the structured signal from the structured signal-emitting device through the viewport and onto the surface, determining an angular difference between the intersection of the structured signal at the target plane in the first medium and the intersection of said at least one structured signal at the target plane in the second medium based on a measured difference between the intersections of the structured signal and the target plane in the first and the second media, and processing the predetermined distance, the measured difference, and the angular difference to produce a rotation matrix applicable to the structured signal.

In yet another of its aspects, the invention provides a method of calibrating a trigonometric-based ranging system in air and water, the trigonometric-based ranging system having a structured signal-emitting device for emitting a structured signal and a sensor having a field of view for sensing signals emitted by the structured signal-emitting device, the structured signal-emitting device and the sensor having a geometric relationship measured in air. The method includes, in each of air and water, determining a sensor matrix for the sensor therein respectively. Rotation and translation of a sensor optical axis of the sensor are measured relative to an ideal sensor optical axis substantially defined by a sensor housing in which the sensor is mounted, by determining the rotation and translation of a sensor co-ordinate system of the sensor in each of air and water concurrently, to provide a rotation/translation matrix for the field of view in each of air and water respectively. Rotation and translation of a new sensor optical axis of a new sensor are measured relative to an ideal new sensor optical axis substantially defined by a new sensor housing in which the new sensor is mounted, by determining the rotation and translation of a new sensor co-ordinate system of the new sensor in each of air and water concurrently, to provide a new rotation/translation matrix for the new sensor in each of air and water respectively. One or more differences between the rotation/translation matrix and the new rotation/translation matrix are determined. The rotation/translation matrix is rotated and translated by the difference, to adjust the rotation/translation matrix for one or more discrepancies between non-idealities associated with the sensor and the sensor housing, and new non-idealities associated with the new sensor and the new sensor housing, to provide a new rotation/translation matrix for the new sensor's field of view in air and water respectively.

In another of its aspects, the invention provides a method of calibrating a trigonometric-based ranging system in air and water, the trigonometric-based ranging system including a structured signal-emitting device for emitting a structured signal and a sensor having a field of view for sensing signals emitted by the structured signal-emitting device, the structured signal-emitting device and the sensor having a geometric relationship measured in air. The method includes in each of air and water, determining a sensor matrix for the sensor therein respectively. Rotation and translation of a sensor optical axis of the sensor are measured relative to an ideal sensor optical axis substantially defined by a sensor housing in which the sensor is mounted, by determining the rotation and translation of a sensor co-ordinate system of the sensor in each of air and water concurrently, to provide a rotation/translation matrix for the field of view in each of air and water respectively. Rotation of a device optical axis of the device is measured relative to an ideal device optical axis substantially defined by a device housing in which the device is mounted, by determining a relative change in an angle of the structured signal, between the structured signal in air and the structured signal in water respectively, to generate a device rotation matrix to be applied to the structured signal. Rotation of a new device optical axis of a new device generating a new structured signal is measured relative to an ideal new device optical axis substantially defined by a new device housing in which the new device is mounted, by determining a new relative change in an angle of the new structured signal between air and water. One or more device differences are determined between the relative change and the new relative change. The new optical axis of the new device is rotated by said at least one device difference, to adjust the device rotation matrix for at least one discrepancy between non-idealities associated with the device and the device housing and new non-idealities associated with the new device and the new device housing respectively, to generate a new rotation matrix to be applied to the new structured signal.

BRIEF DESCRIPTION OF THE DRAWINGS

The invention will be better understood with reference to the attached drawings, in which.

DETAILED DESCRIPTION

Figure 1:
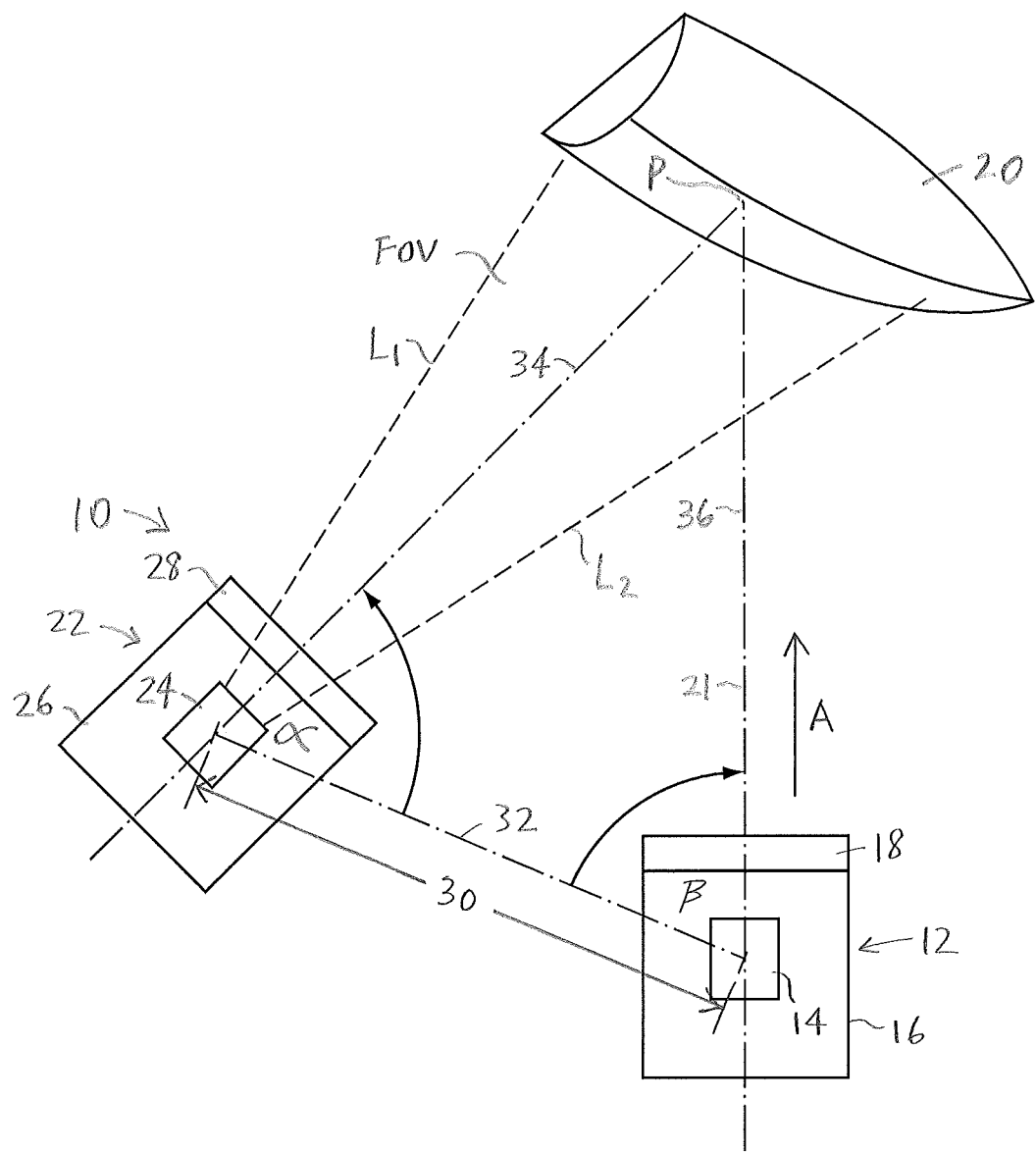
FIG. 1 (also described previously) is a schematic illustration of a typical trigonometric-based ranging system.
Figure 2A:
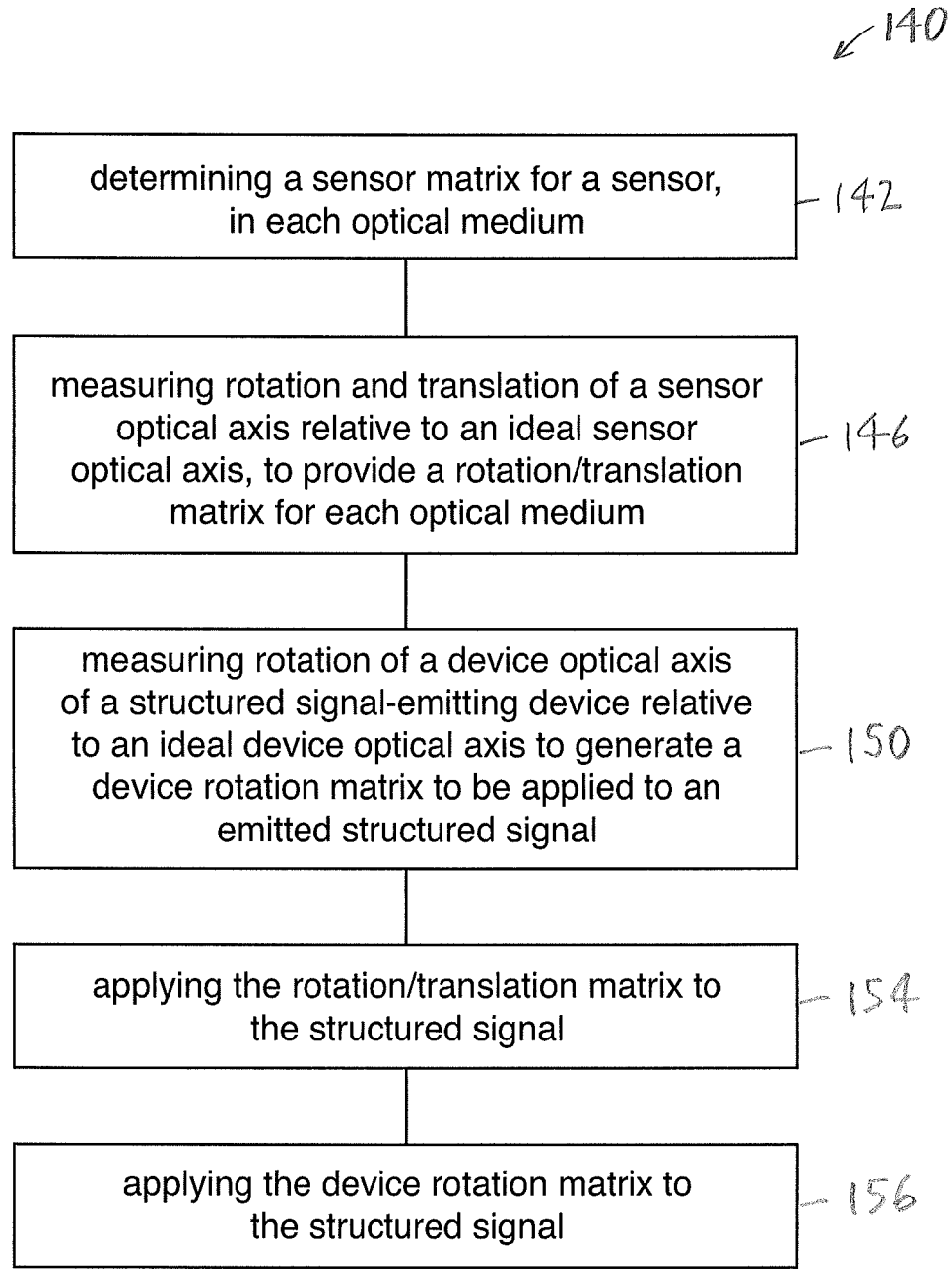
FIG. 2A is a flow chart schematically illustrating an embodiment of a method of the invention.
Figure 2B:
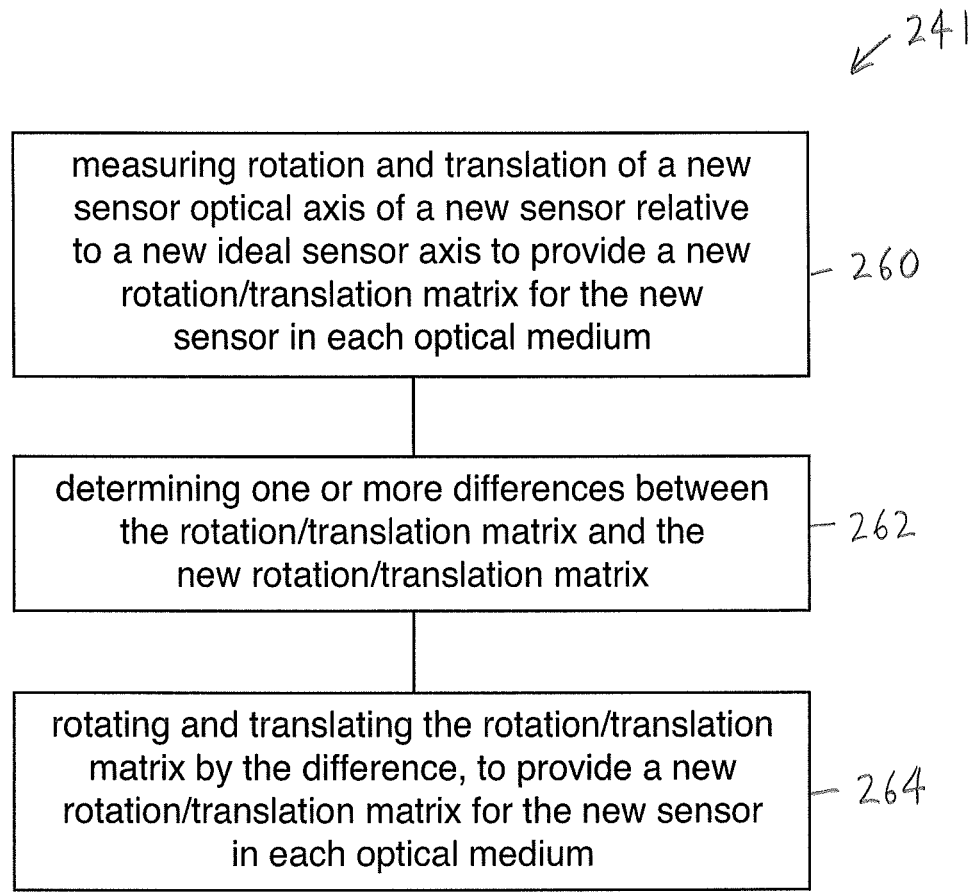
FIG. 2B is a flow chart schematically illustrating another embodiment of a method of the invention.
Figure 2C:
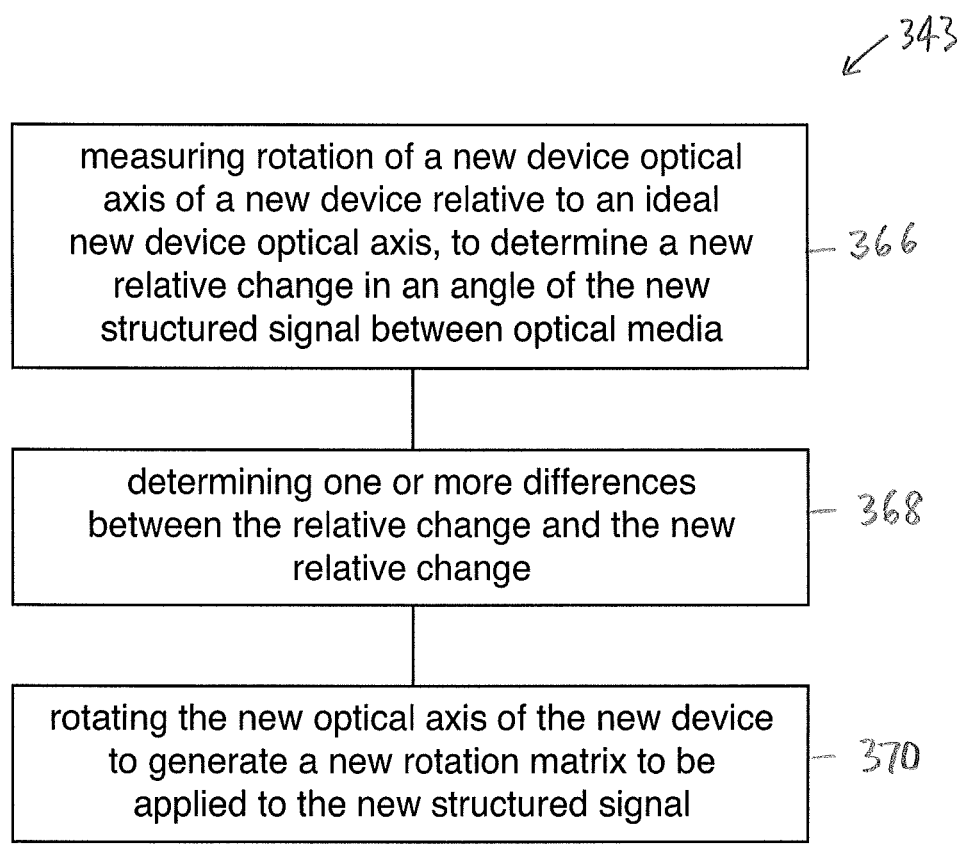
FIG. 2C is a flow chart schematically illustrating another embodiment of a method of the invention.

In the attached drawings, like reference numerals designate corresponding elements throughout. To simplify the description, the numerals used previously in describing FIG. 1 will be used again after increasing the numerals by 100 where the parts to be described correspond to parts already described. Reference is first made to FIGS. 2A-2C to describe an embodiment of a method in accordance with the invention indicated generally by the numeral 140 (FIG. 2A).

The method 140, which is one embodiment of the method of the invention, is for calibrating a trigonometric-based ranging system 110 (FIG. 3A) in air and water. It is preferred that the trigonometric-based ranging system 110 includes a structured signal-emitting device 114 for emitting a structured signal 121 and a sensor 124 having a field of view for sensing signals emitted by the structured signal-emitting device 114, the structured signal-emitting device 114 and the sensor 124 having a geometric relationship measured in air. In one embodiment, the method preferably includes, in each of air and water, determining a sensor matrix for the sensor 124 therein respectively (step 142, FIG. 2A). It is also preferred that rotation and translation of a sensor optical axis 134 of the sensor 124 is measured relative to an ideal sensor optical axis 144 (FIG. 3B) substantially defined by a sensor housing 126 in which the sensor 124 is mounted, by determining the rotation and translation of a sensor co-ordinate system of the sensor 124 in each of air and water concurrently, to provide a rotation/translation matrix for the field of view in each of air and water respectively (step 146). The method 140 preferably also includes measuring rotation of a device optical axis 136 of the device 114 relative to an ideal device optical axis 148 (FIG. 3C) substantially defined by a device housing 116 in which the device 114 is mounted, by determining a relative change in an angle $\gamma$ of the structured signal (FIG. 4C), between the structured signal in air and the structured signal in water respectively, to generate a device rotation matrix to be applied to the structured signal 121 (step 150).

In another embodiment, the method 140 preferably includes the step of applying the rotation/translation matrix to the structured signal (step 154, FIG. 2A). It is also preferred that the method includes applying the device rotation matrix to the structured signal (step 156), to determine an apparent geometric relationship of the structured signal-emitting device and the sensor in water.

The method of the invention allows a trigonometric-based ranging system 110 that has been calibrated in a first transmissive medium to be used in a second transmissive medium without performing a full calibration in the second medium, by measuring and correcting for small imperfections in the manufacturing and/or mechanical mounting of the sensor and structured signal-emitting device. In the foregoing description of the method 140 of the invention, the two transmissive media of interest are air and water. However, it will be understood that the method of the invention may be utilized in respect of any two or more transmissive media. In addition, although the examples described herein generally involve transmission of laser light in optical media, it will be understood that the method of the invention is applicable to any other forms of signal, such as acoustic, where a signal is transmitted and received to obtain geometric information.

As described above, if the trigonometric-based ranging system 10 of the prior art is to be used in a second optical medium, then the current state of the art is to perform both stages of the conventional calibration method (i.e., optical calibration of the sensor, and measurement of the relationship between the laser and sensor) in the second optical medium, as well as in the first optical medium. As noted above, small imperfections in manufacturing and mounting coupled with refractive effects introduce small changes into the apparent position of the laser plane, requiring a new calibration to be performed. For the purposes hereof, the imperfections in manufacturing and mounting each of the structured signal-emitting device and the sensor are collectively referred to as "non-idealities".

Figure 3A:
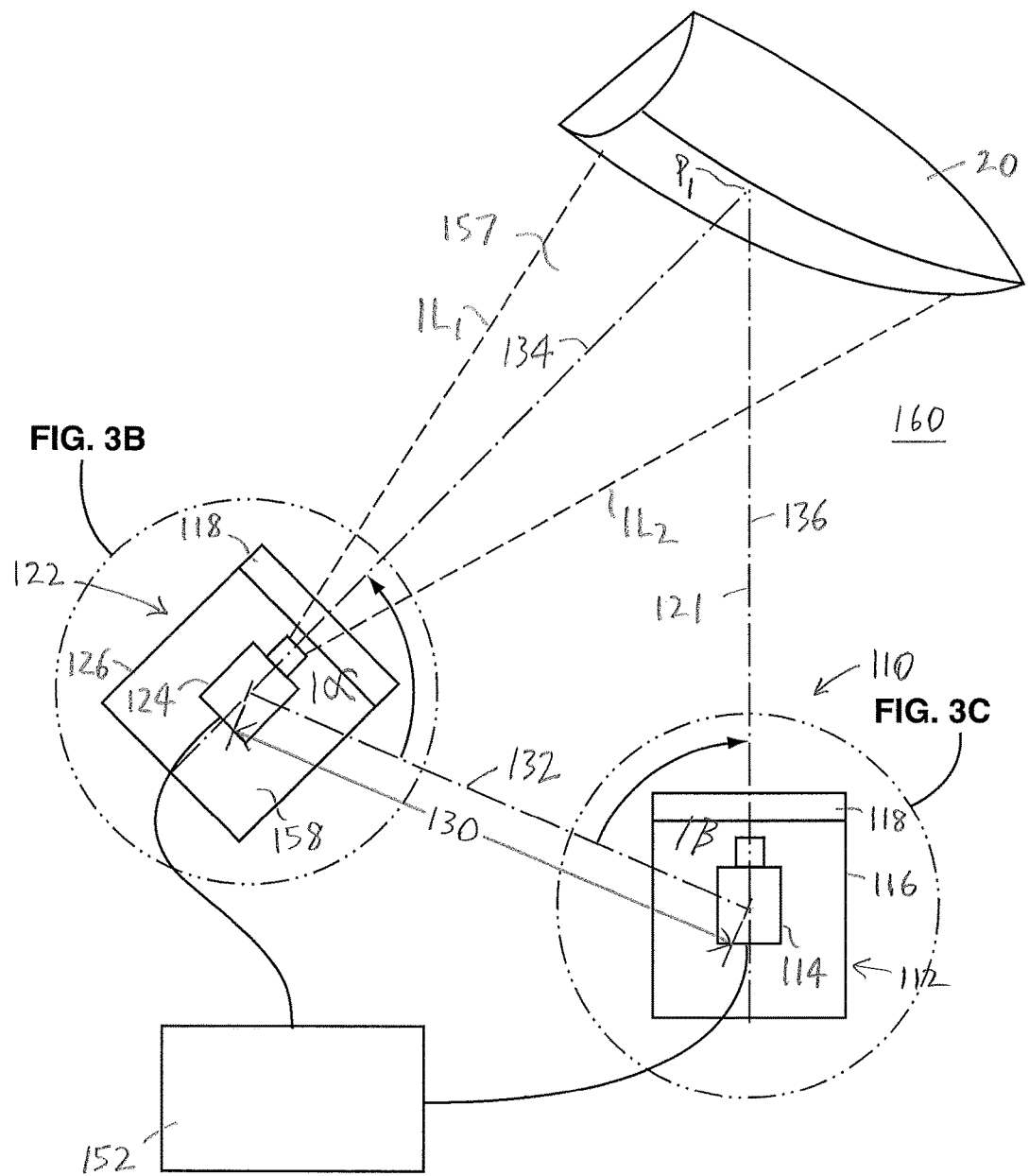
FIG. 3A is a schematic illustration of an embodiment of a trigonometric-based ranging system of the invention.

An embodiment of the trigonometric-based ranging system 110 is schematically illustrated in FIG. 3A. In one embodiment, the trigonometric-based ranging system 110 preferably includes a structured signal-emitting assembly 112 that includes the structured signal-emitting device 114 and the device housing 116 in which the device 114 is mounted. The system 110 preferably also includes a sensor assembly 122 that includes the sensor 124 and the sensor housing 126 in which the sensor 124 is mounted. The sensor housing 126 preferably includes a sensor viewport 128, and the device housing 116 preferably includes a sensor viewport 118.

As can also be seen in FIG. 3A, in the trigonometric-based system 110, the device 114 and the sensor 124 have a geometric relationship that is at least partially determined by a baseline distance 130 measured along a straight line 132 between the device 114 and the sensor 124, and angles $1\alpha$, $1\beta$ defined between the actual optical axes 134, 136 and the line 132. As noted above, the geometric relationship preferably is determined in air.

The sensor 124 has a field of view 157 defined by its sides $1L_1$ and $1L_2$. (It will be understood that the field of view 157 defines a three-dimensional generally conical shape.) Data generated by the sensor 124 and the device 114 are processed in a suitable processor 152 which is preferably included in the system 110. Although the processor 152 is illustrated as being directly connected to the device 114 and the sensor 124, those skilled in the art would appreciate that data may be transmitted between the processor 152 and the sensor 124, and between the processor and the device 114, in any suitable manner. In FIG. 3A, the laser light intersects the target object 20 at a point (or a series of points, or location(s)) schematically illustrated by the point "$P_1$".

The optical axes 134, 136 illustrated in FIG. 3A are the actual optical axes, which differ from the "ideal" optical axes 144, 148 (FIGS. 3B, 3C) in that positions of the actual optical axes are based on the actual positions of the sensor 124 in the sensor housing, and the structured signal-emitting device 114 in the device housing 116, thus taking non-idealities into account. Although the deviation of the actual axis from the "design" (or "ideal") axis is relatively small in each case, such deviation is significant, and its impact is exacerbated by refractive effects, as will be described. The deviation due to non-idealities is taken into account by the calibration methods of the invention, as will be described.

The method of the invention makes it possible to transfer a calibration taken in one optical medium into another optical medium without performing a full conventional calibration in each such medium. For example, as described above, in one embodiment, the method of the invention makes it possible to transfer a calibration taken in air into water, without performing a full conventional calibration in water.

In general terms, the method of the invention preferably involves characterizing individual system components in both optical media of interest, and using the parameters from the individual characterizations to transform a known calibration of a full system from one of the optical media into the other one. This is done by measuring refractive changes due to non-idealities specific to both the sensor 124 and structured signal-emitting device 114 and correcting for these non-idealities in the calibration. By measuring and correcting for these small optical changes (i.e., only those due to non-idealities) between two optical media, the relative positions between the sensor and structured signal-emitting device 114 measured in one media (i.e., the geometric relationship, as measured in the first optical medium) can be used directly in another. Furthermore, by characterizing the individual components of the system, and adjusting the calibration to correct for non-idealities, it is possible to field replace these components of the trigonometric-based ranging system without requiring a full system re-calibration.

Figure 3B:
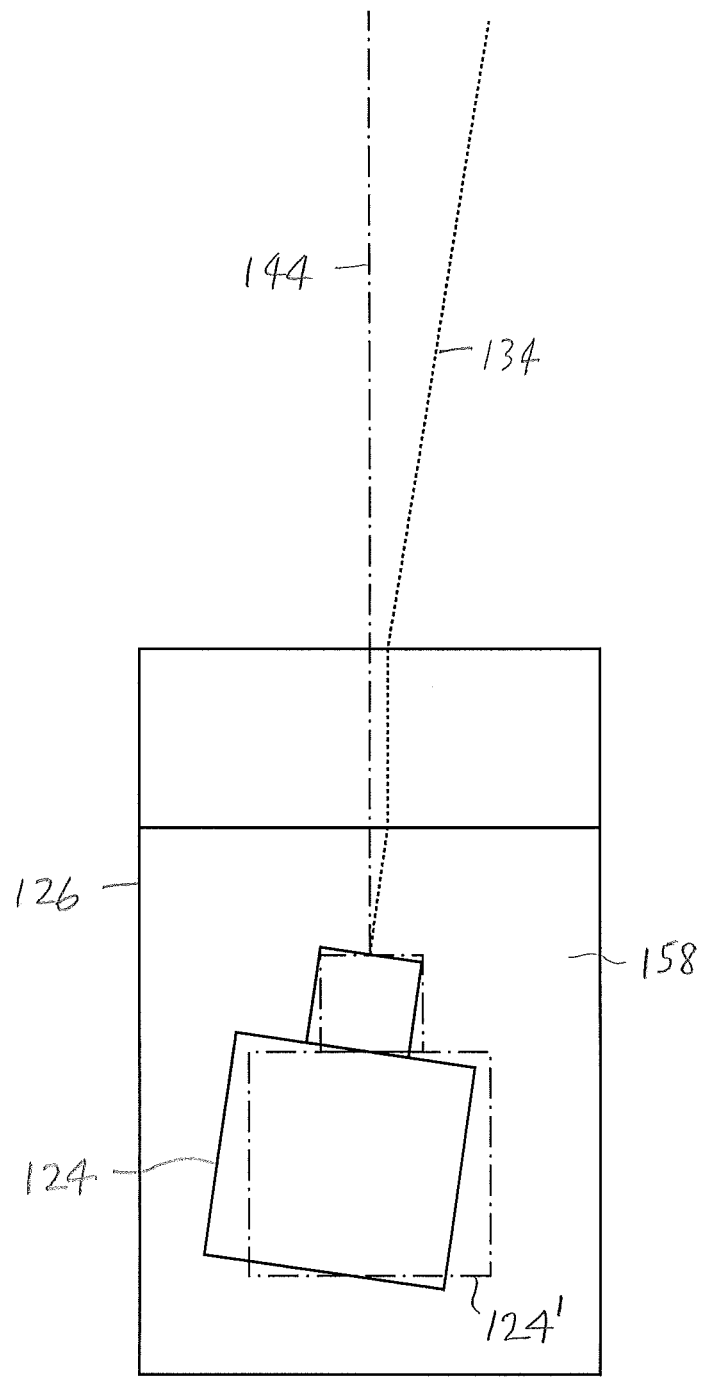
FIG. 3B is a schematic illustration of a sensor assembly of the invention, drawn at a larger scale.

In FIG. 3B, the sensor assembly 122 is schematically illustrated to show the effect of non-idealities. The sensor 124 (i.e., the actual sensor) is delineated with solid lines, and an ideal sensor 124' is outlined in chain-dot outline. As noted above, the non-idealities may arise due to minor errors in manufacturing (i.e., of the sensor 124, the sensor housing 126, or other components included in the sensor assembly 122) and/or minor errors in mounting the sensor 124 in the sensor housing 126. It will be understood that the differences between the sensor 124 and the ideal sensor 124' are exaggerated in FIG. 3B for clarity of illustration.

It will be understood that the sensor housing 126 includes the sensor viewport 128 and defines a cavity 158 in which the sensor 124 preferably is mounted. The cavity 158 preferably has air in it, having a refractive index referred to for purposes of discussion as a first refractive index. As is well known in the art, the viewport 128 preferably is made of any suitable material. For instance, the viewport 128 may be made of glass or a suitable acrylic plastic. Those skilled in the art would appreciate that the viewports preferably are formed so as to minimize distortion of structured signals transmitted therethrough. The sensor viewport 128 has a second refractive index, and the optical medium 160 (FIG. 3A) positioned outside the housing has yet another refractive index, unless the optical medium 160 is air. As can be seen in FIG. 3B, the net result of the non-idealities is that the actual sensor optical axis 134 is rotated and translated from the ideal sensor optical axis 144. It will be understood that the position of the actual sensor optical axis 134 is described relative to the ideal sensor optical axis 144 in three dimensions. The ideal sensor optical axis 144 is defined by an ideal sensor housing, i.e., one positioned substantially where the sensor housing 126 is positioned, but having no non-idealities.

Figure 3C:
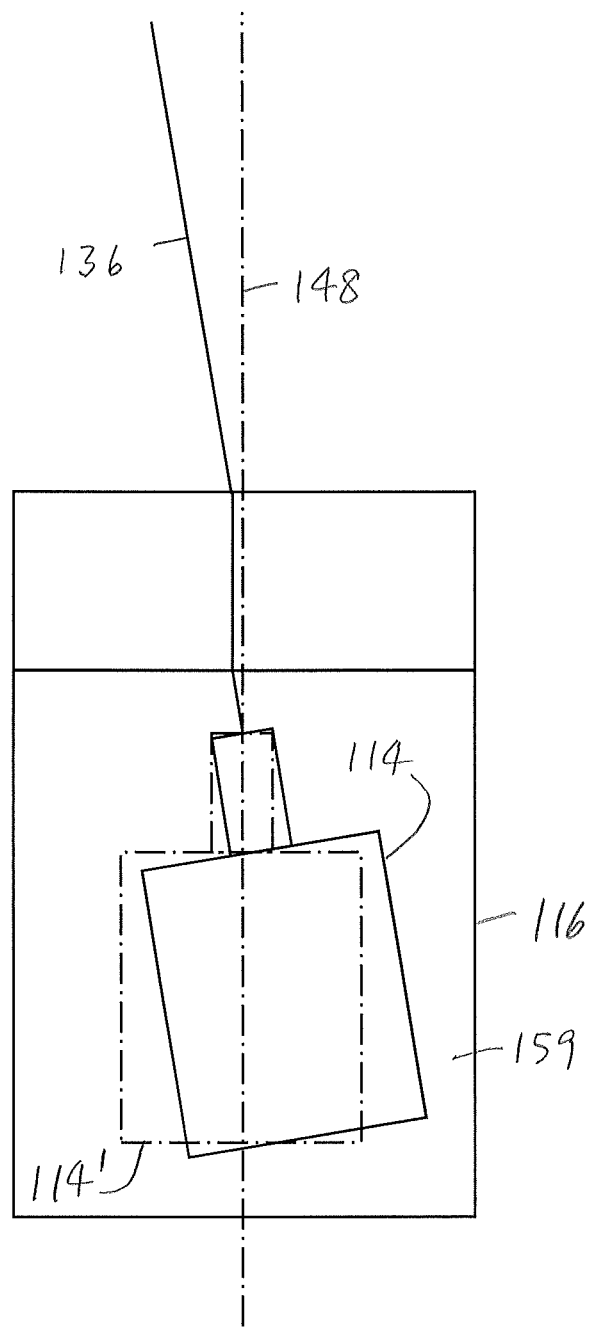
FIG. 3C is a schematic illustration of an embodiment of a structured signal-emitting assembly of the invention.

The device assembly 112 is schematically illustrated in FIG. 3C. The device housing 116 defines a cavity 159 therein in which the device 114 is mounted. The viewport 118 preferably is made of any suitable material, e.g., glass or acrylic plastic, and formed so as to minimize distortion of structured signals transmitted therethrough. It will be understood that the cavity 159 preferably also has air in it. The actual structured signal-emitting device 114 is illustrated in solid lines, and an ideal device 114' is illustrated in chain-dot outline. As can be seen in FIG. 3C, due to non-idealities, the actual device optical axis 136 has been rotated from the ideal device optical axis 148. It will be understood that the differences between the device 114 and the ideal device 114' are exaggerated for clarity of illustration. The ideal device optical axis 148 is defined by an ideal device housing, i.e., one positioned substantially where the device housing 116 is positioned, but having no non-idealities.

Figure 8A:
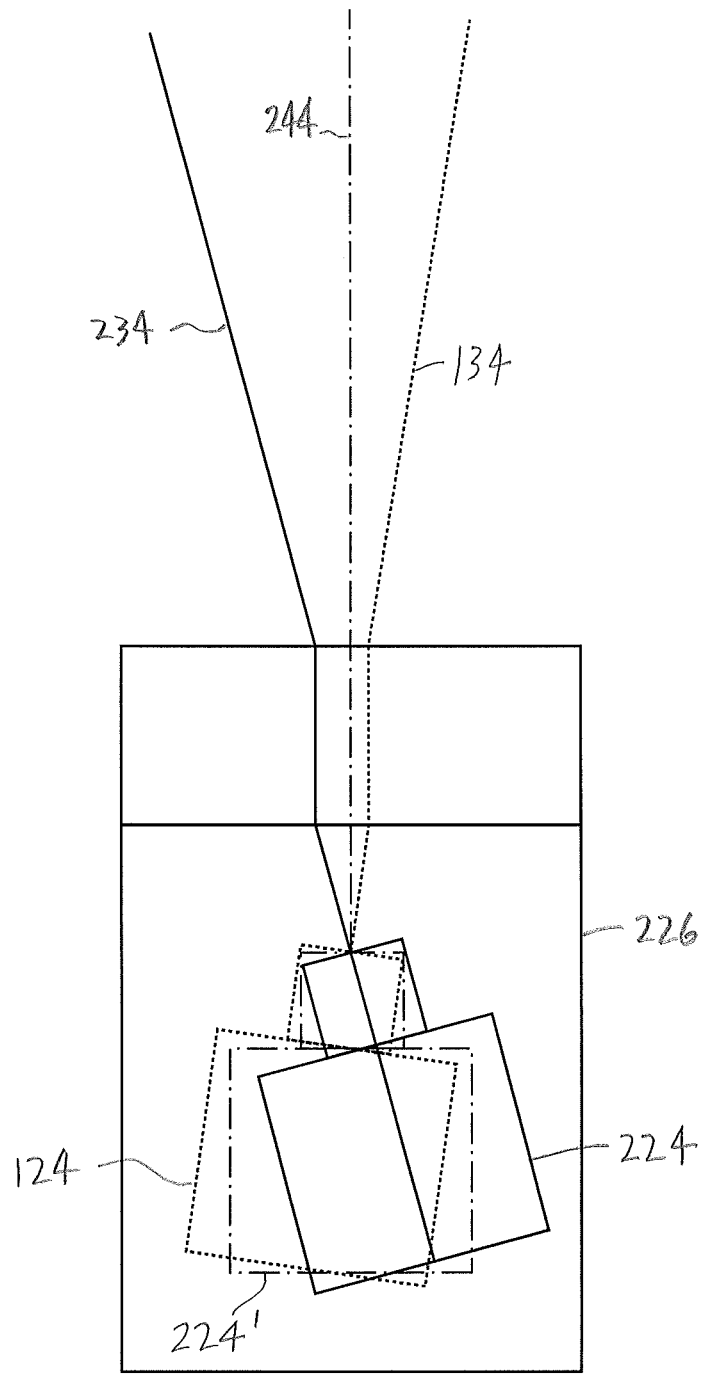
FIG. 8A is a schematic illustration of a new sensor positioned in a sensor housing, drawn at a larger scale.

An example of using the method of the invention to replace the sensor 124 is as follows. In one embodiment, a method 241 of the invention preferably includes measuring rotation and translation of a new sensor optical axis 234 of a new sensor 224 (FIG. 8A) relative to an ideal new sensor optical axis 244 substantially defined by a new sensor housing 226 in which the new sensor 224 is mounted, by determining the rotation and translation of a new sensor co-ordinate system of the new sensor 224 in each of air and water concurrently, to provide a new rotation/translation matrix for the new sensor in each of air and water respectively (step 260, FIG. 2B). One or more differences between the rotation/translation matrix and the new rotation/translation matrix are determined (step 262). The rotation/translation matrix is rotated and translated by the difference(s), to adjust the rotation/translation matrix for one or more discrepancies between non-idealities associated with the sensor 124 and the sensor housing 126, and new non-idealities associated with the new sensor 224 and the new sensor housing 226, to provide a new rotation/translation matrix for the new sensor's field of view in air and water respectively (step 264). An ideal new sensor is identified by reference numeral 224' in FIG. 8A.

Figure 8B:
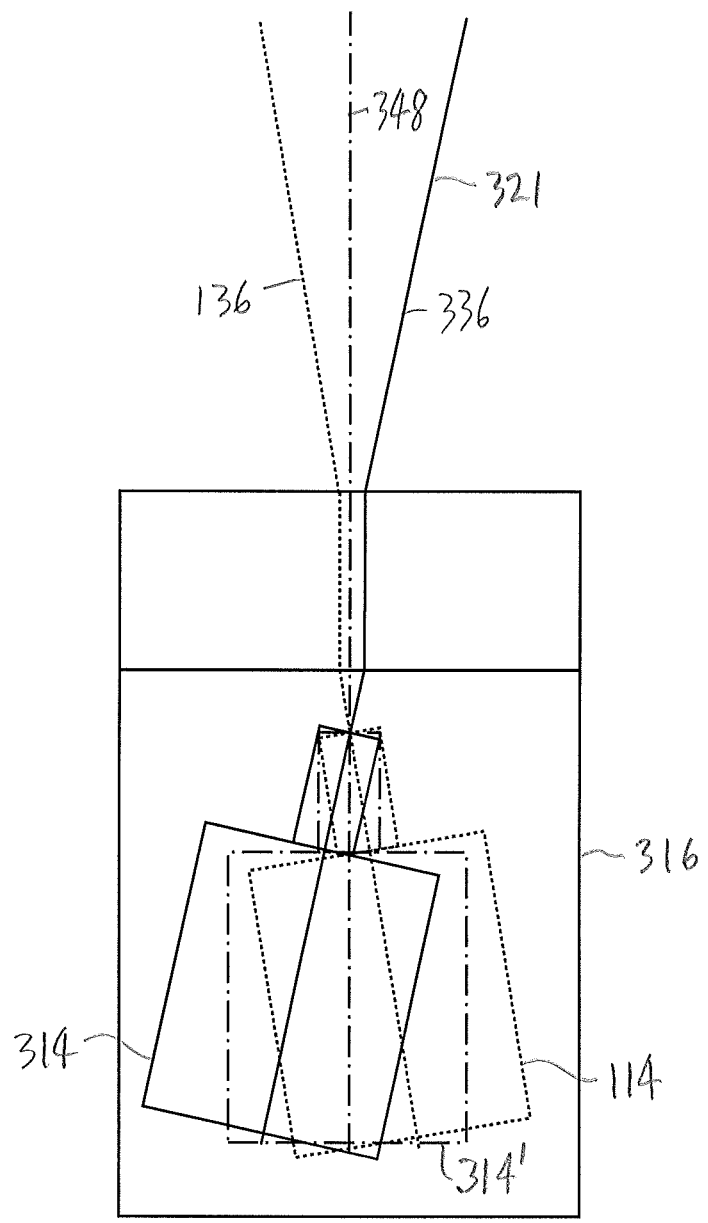
FIG. 8B is a schematic illustration of a new structured signal-emitting device positioned in a device housing.

An example of using the method of the invention to replace the structured signal-emitting device 114 is as follows. In one embodiment, a method 343 of the invention preferably includes measuring rotation of a new device optical axis 336 of a new device 314 (FIG. 8B) generating a new structured signal 321 relative to an ideal new device optical axis 348 substantially defined by a new device housing 316 in which the new device 314 is mounted, by determining a new relative change in an angle of the new structured signal between air and water (step 366, FIG. 2C). One or more device differences are determined between the relative change and the new relative change (step 368). The new optical axis 336 of the new device 314 is rotated by said at least one device difference, to adjust the device rotation matrix for one or more discrepancies between non-idealities associated with the device 114 and the device housing 116 and new non-idealities associated with the new device 314 and the new device housing respectively, to generate a new rotation matrix to be applied to the new structured signal 321 (step 370). An ideal new device is identified by reference numeral 314' in FIG. 8B.

It will be understood that the sequence of the steps in the foregoing methods need not necessarily be as described above. For example, those skilled in the art would appreciate that steps 146 and 150 in FIG. 2A may be completed in any convenient order.

In general, the differences in calibration of the triangulation-based ranging system in one medium relative to another are due to differences in the speed of travel of the signal in the transmissive medium. Specifically for a laser ranging system this manifests as a refraction at the interface between the optical medium and the sensor and laser viewports due to differences in the index of refraction of the various optical media. In the following description, it will be understood that the structured signal is laser light, in the form of a laser light plane.

Figure 4A:
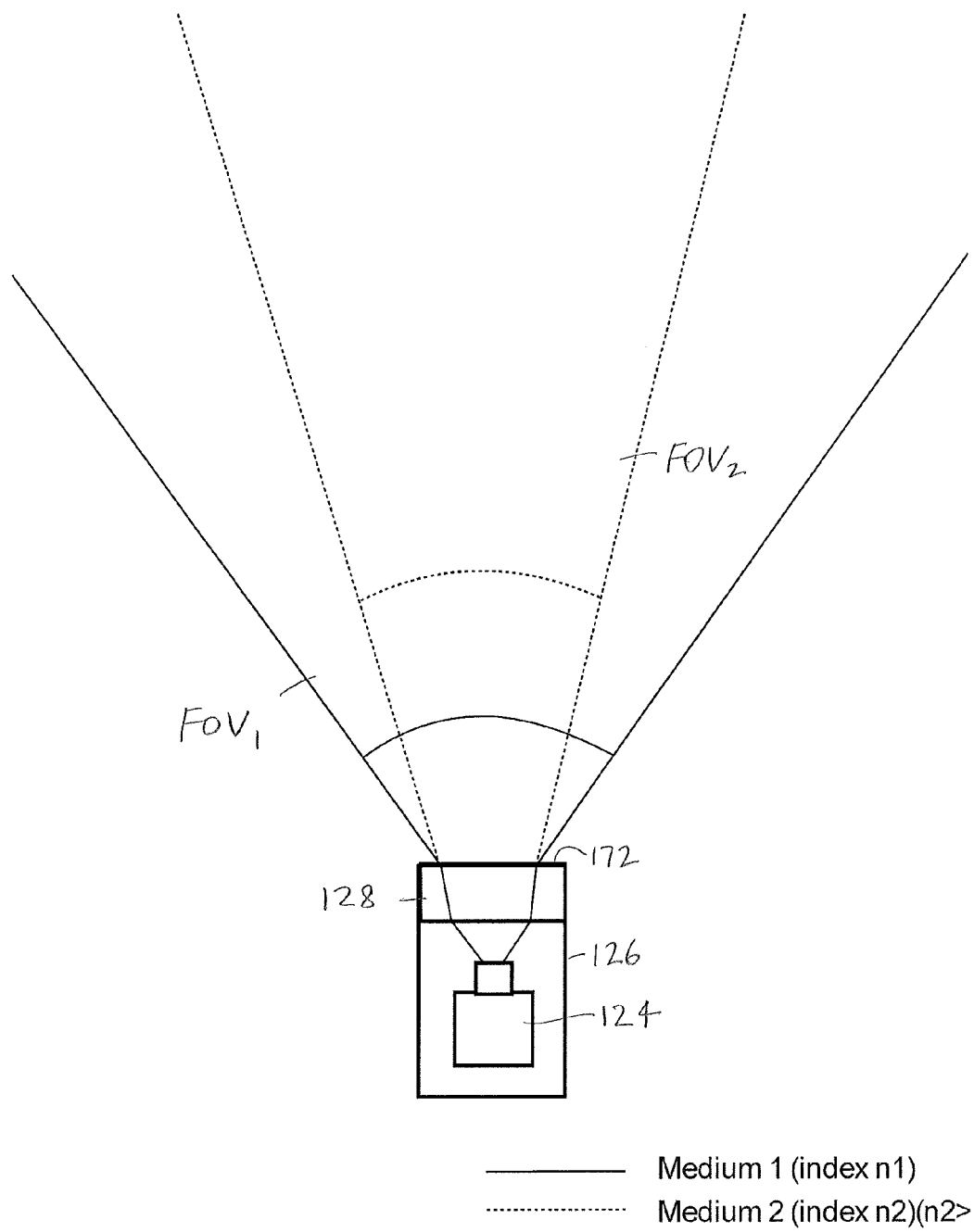
FIG. 4A is a schematic illustration of an embodiment of a sensor assembly of the invention, drawn at a smaller scale.

There are three ways in which the trigonometric-based ranging system 110 is affected by refraction, as follows.
(i) With a change in the optical medium in which the system is immersed, the field of view of the sensor changes (for example, in going from air (medium 1) to water (medium 2), the field of view decreases). This is due to the change in refraction at a viewport surface 172 of the viewport 128, and cannot be reduced. This is illustrated in FIG. 4A, in which the field of view in medium 1 is identified as "$FOV_1$", and the field of view in medium 2 is identified as "$FOV_2$".

Figure 4B:
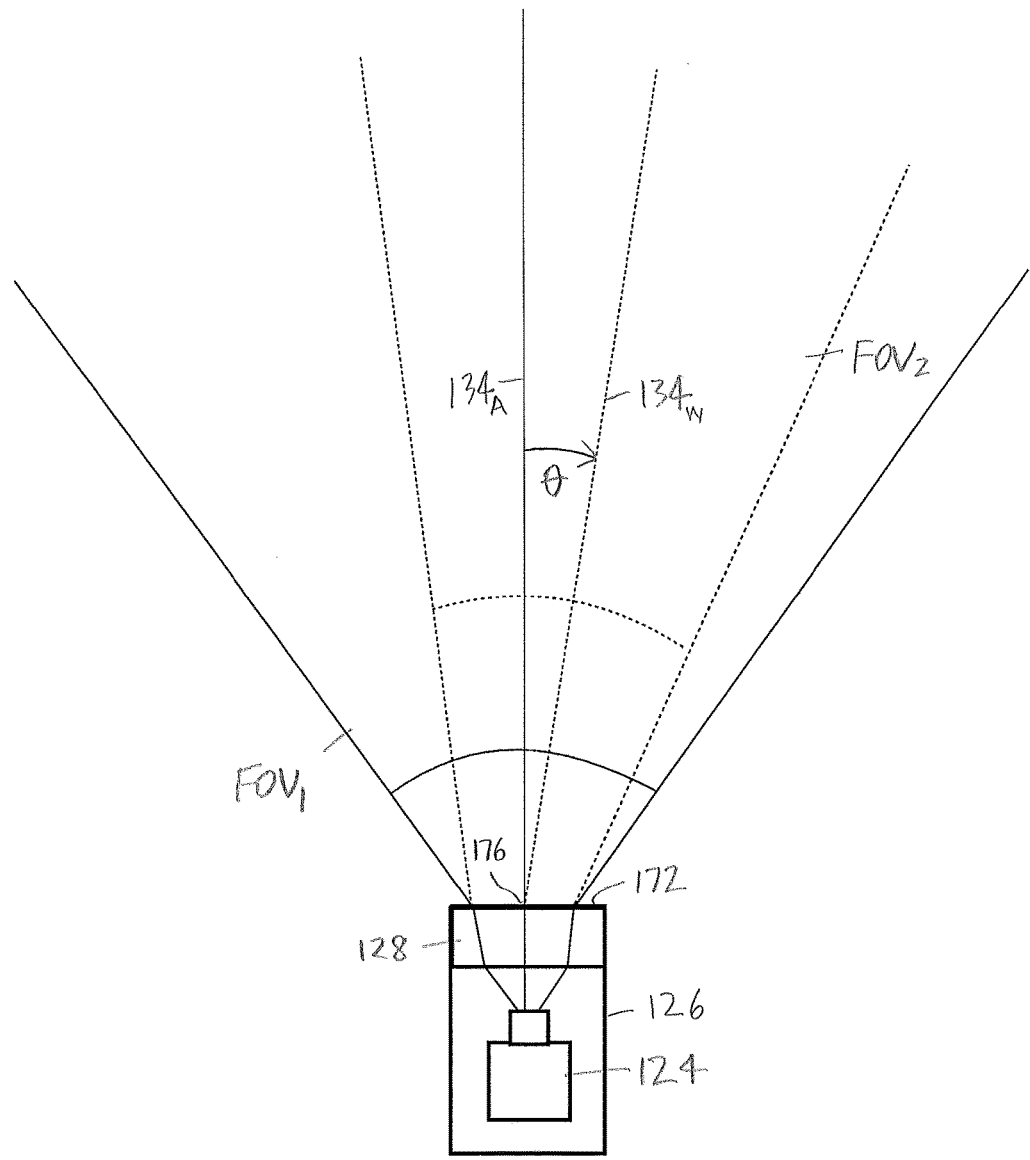
FIG. 4B is another schematic illustration of the sensor assembly of FIG. 4A.

(ii) In going from medium 1 to medium 2, the optical axis 134 of the sensor 124 rotates, changing the apparent orientation of the scene. This is significant if the sensor's optical axis 134 is not aligned perpendicular to the viewport surface 172 (FIG. 4B). (It will be understood that, if the optical axis 134 is perpendicular to the viewport surface 172, then there is no effect, and there is only a small effect if the optical axis 134 is almost perpendicular to the viewport surface 172.) For example, in FIG. 4B, the actual optical axis in air is designated $134_A$, and the optical axis in water is designated $134_W$ for clarity of illustration. As shown in FIG. 4B, the optical axis $134_W$ is rotated through an angle $\ominus$ from the optical axis $134_A$. (It will be understood that the rotation is in three dimensions.)

Figure 4C:
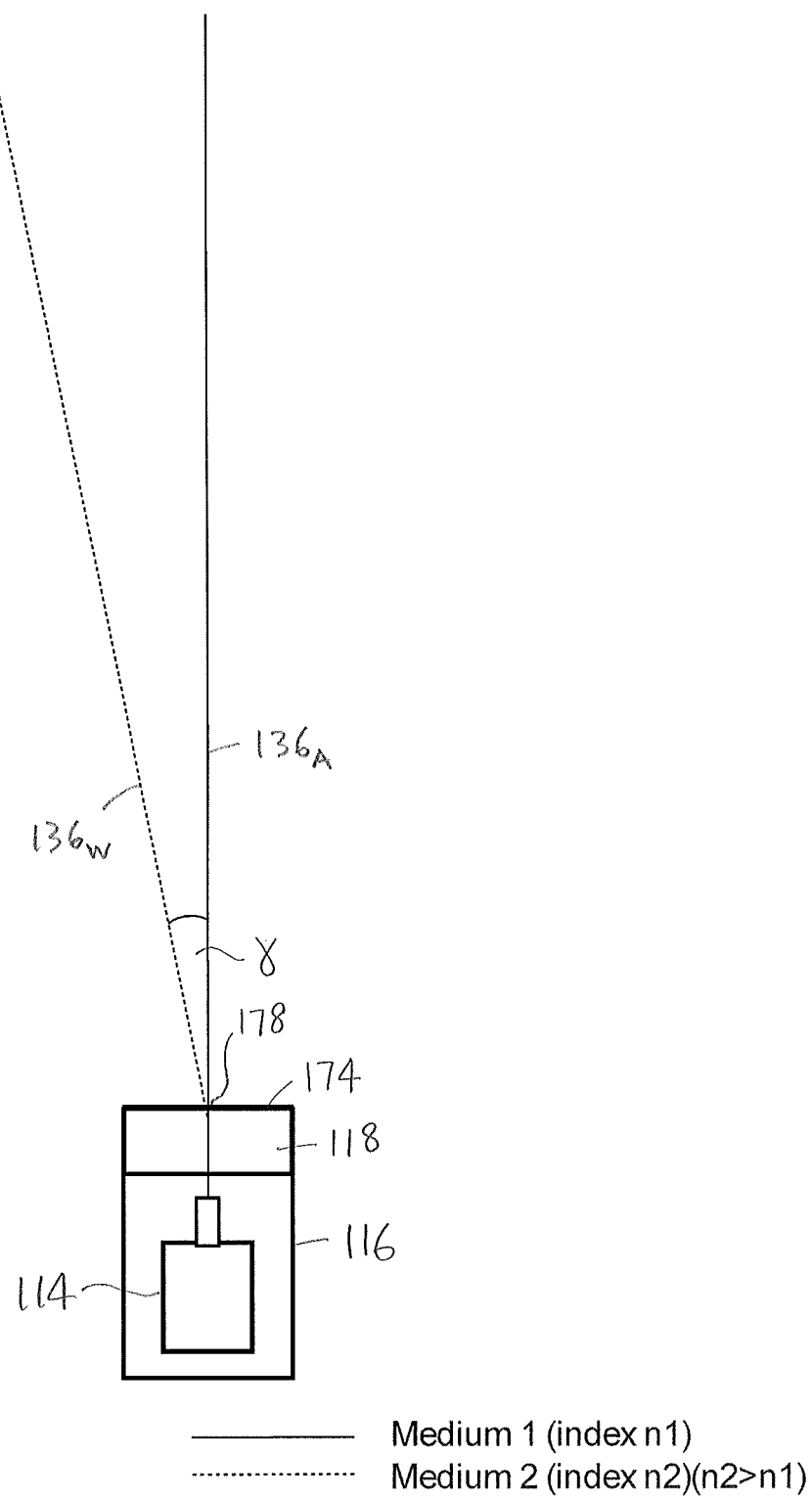
FIG. 4C is a schematic illustration of an embodiment of a structured signal-emitting assembly of the invention.

(iii) In FIG. 4C, the structured signal-emitting device 114 is shown mounted in the device housing 116, and the viewport 118 has a viewport surface 174. As shown in FIG. 4C, when the structured signal-emitting assembly 112 is immersed in medium 2 (e.g., water), the laser light plane 121 emitted by the device 114 refracts at the viewport surface 174, changing the orientation of the laser plane 121. In FIG. 4C, the actual device optical axis in medium 1 (e.g., air) is designated $136_A$, and the actual device optical axis in medium 2 is designated $136_W$ for clarity of illustration. As shown in FIG. 4C, the optical axis $136_W$ has been rotated through the angle $Y$ relative to the optical axis $136_A$ by the refraction. This is also a small effect if the laser plane 121 is oriented perpendicular to the viewport surface 174.

In FIG. 4B, a refraction point at the viewport surface 172 where the optical axes $134_A$, $134_W$ intersect can be seen, and is identified for clarity of illustration by the reference numeral 176. Similarly, a refraction point is identified in FIG. 4C by the reference numeral 178. The optical axes $136_A$, $136_W$ intersect with each other at the viewport surface 174 at the refraction point 178.

Figure 5:
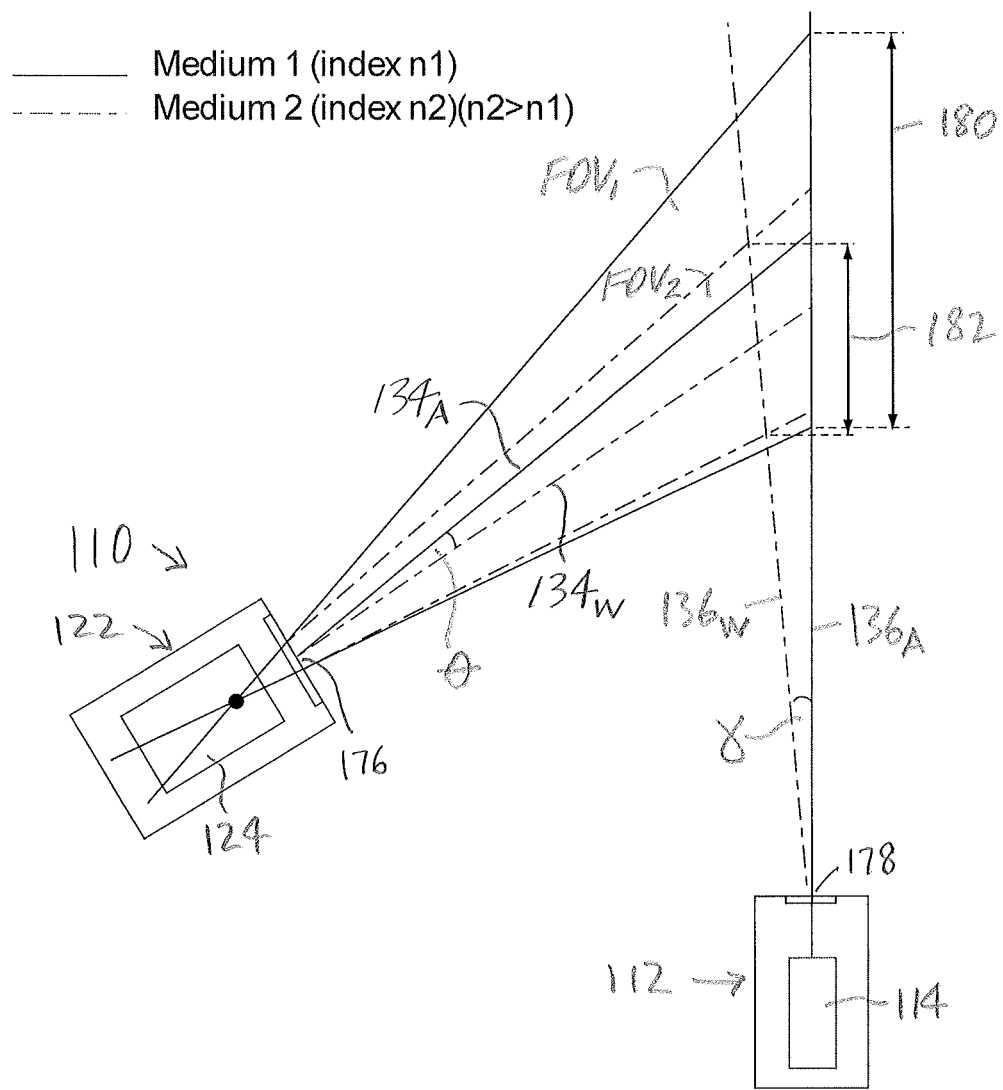
FIG. 5 is a schematic illustration of an embodiment of a system of the invention, drawn at a smaller scale.

In FIG. 5, the refractive effects that occur at the refraction point 178 of the device housing 116 and the refraction point 176 of the sensor housing 126 can be seen. As shown in FIG. 4B, this difference in refraction causes the field of view of the sensor to decrease when moving to an optical medium with a higher index of refraction. As a result, the image of an object a fixed distance apart from the sensor is magnified. For this example, n1 is the index of refraction of medium 1 (e.g., air) and n2 is the index of refraction of medium 2 (e.g., water). In FIG. 5, the scope of $FOV_1$ as projected therein at a selected distance from the sensor is represented by line 180, and the scope of $FOV_2$ as projected therein at the selected distance is represented by line 182.

This change in the field of view when moving from medium 1 to medium 2 changes the mapping that is defined by the sensor matrix. If a straight line between the middle of the sensor 124 and the centre of the field of view is not perpendicular to the surface 172 of the viewport 128, the entire field of view is rotated, in addition to the field of view's scope changing (i.e., from $FOV_1$ to $FOV_2$ when moving from medium 1 to medium 2). This rotation of the optical sensor axis due to refraction also produces a small shift in the principle point of the sensor.

As noted above, a further effect due to refraction is the apparent rotation of the emitted signal 121 (laser plane, for laser ranging systems) due to the rotation of the sensor's optical axis 134 due to small misalignments of the sensor 124 relative to the sensor viewport 172, so that the actual optical sensor axis 134 is not perpendicular to the sensor viewport surface 172.

The final effect due to refraction is the actual rotation of the transmitted signal 121 at the signal emitter viewport window surface 174. For the example of a laser ranging system, if the laser plane 121 is not perfectly perpendicular to the laser viewport surface 174, refraction will occur.

To address the change in the field of view, the first part of the calibration method of the invention involves measuring the new sensor parameters (camera matrix, for laser ranging systems) in the new media using camera calibration techniques, with some modifications. However, to address the apparent rotation of the optical axis of the sensor, the second part of the calibration method of the invention measures the rotation and translation of the sensor co-ordinate system, and produces a rotation/translation matrix that can then be applied to the transmitted signal. Also, to address the rotation of the plane representing the laser light, the third part of the calibration method of the invention is to measure the rotation of the emitted signal due to refraction, and generate a rotation matrix that can correct for this effect.

As noted above, utilizing the innovative aspects of the method of the invention, the trigonometric-based ranging system 110 may be calibrated without requiring the entire system to be immersed in the second optical medium, e.g., water. Also, the method of the invention may be utilized to calibrate the system when the sensor assembly 122 or the structured signal-emitting assembly 112 is replaced, without requiring re-calibration of the entire system.

It will be understood that FIG. 5 is a projection onto a two-dimensional surface. The angles $\ominus$ and $Y$ are compound angles in three-dimensional space.

The first stage of this method involves measuring a new set of sensor angular input properties. For a laser measurement system this means a new camera matrix for the optical sensor. As noted above, prior art for calibrating optical sensors used with laser ranging devices involves an established camera calibration process. However, the method of the invention extends the prior art of laser scanner calibration by requiring the camera calibration process to be performed in every optical medium of interest, and the camera matrix and distortion parameters from the original calibration are replaced with the new versions thereof measured in the new optical medium. Equation 1 demonstrates this process, where $[CM_{nx}]$ represents the camera matrix for an optical medium with index of refraction nx.

$$[CM_{n1}] \rightarrow [CM_{n2}] \qquad \text{Equation 1}$$

Once the new sensor angular parameters have been measured, the second stage of the calibration method of the invention, which involves measuring the rotation and translation of the co-ordinate system defined by the sensor, can proceed. This translation and rotation of the principle point is due to the angular rotation (i.e., through the angle $\ominus$) of the optical axis of the sensor 124 at the refraction point 176 of the sensor 124, as shown in FIG. 4B.

Figure 6A:
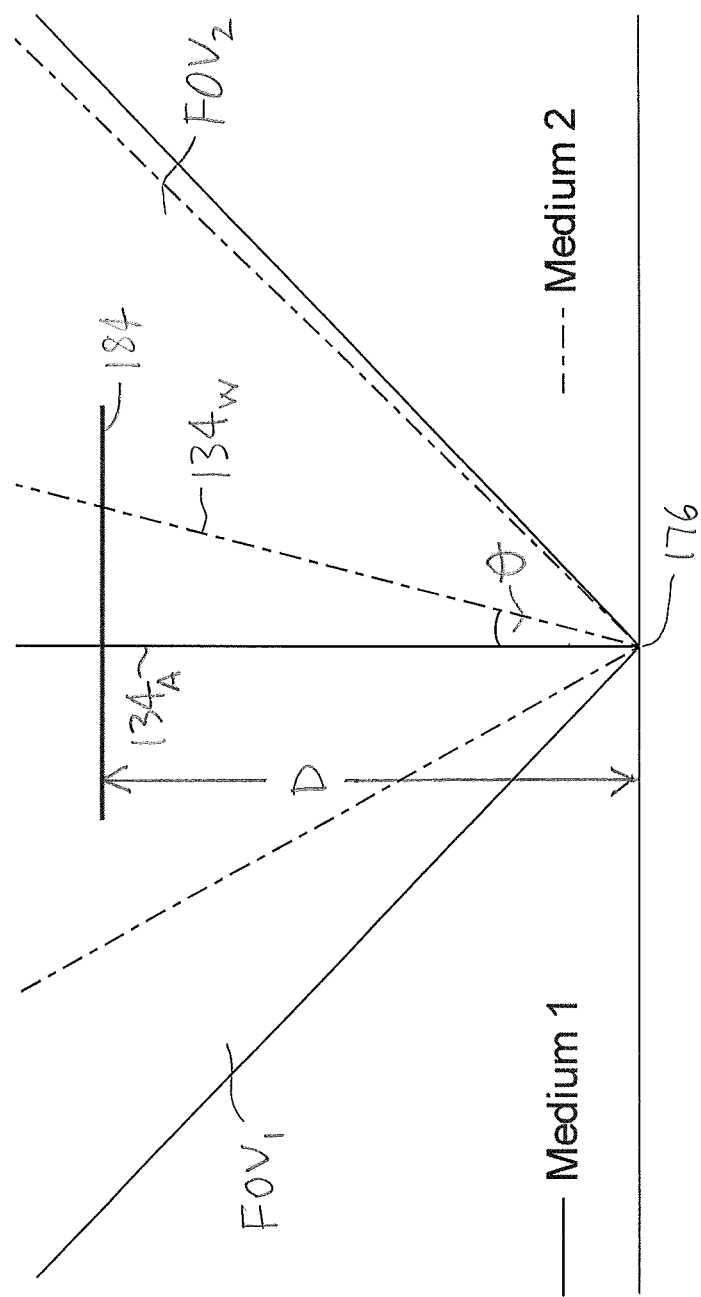
FIG. 6A is a top schematic view of an embodiment of an apparatus utilized in an embodiment of a method of the invention.

This angular rotation is measured by concurrently measuring the position of a fixed symmetric target of known geometry 184 in both media of interest. As can be seen in FIGS. 6A and 6B, the target 184 preferably has a substantially planar surface 185 with a regular pattern 186 thereon. Preferably, the pattern 186 includes upper and lower portions 187A, 187B that are symmetrically divided by a plane of symmetry, represented in FIG. 6B by a straight line "PS". When the target location is determined using established techniques and using the sensor matrices appropriate for each optical media, then any difference in the calculated target geometry relative to the true target geometry is a result of the translation and rotation of the sensor/camera coordinate system. In FIG. 6D, a laser plane normal in air is identified as "LPN$_A$", and a laser plane normal in water is identified as "LPN$_W$". (It will be understood that the differences between "LPN$_A$" and "LPN$_W$" as illustrated in FIG. 6D are exaggerated for clarity of illustration.) For the simple case of the symmetric target being a single plane, the rotation of the co-ordinate system is equal to the difference between the two measured plane normals, "LPN$_A$" and "LPN$_W$". To measure the translation of the origin using a flat plane as the target, the equations of two or more planes with different orientations preferably are measured in both optical media. The position of the origin can be triangulated from these two plane parameters.

Figure 6C:
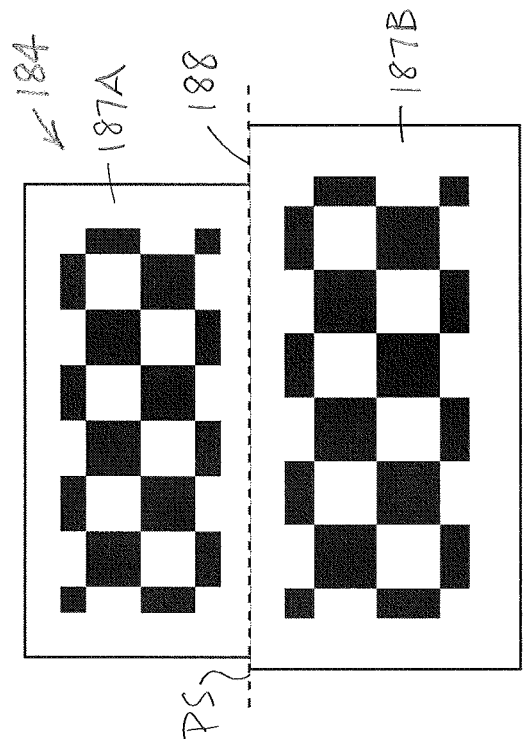
FIG. 6C is an illustration providing an example of the appearance of the optical sensor calibration plate of FIG. 6B when observed in two optical media concurrently.
Figure 6B:
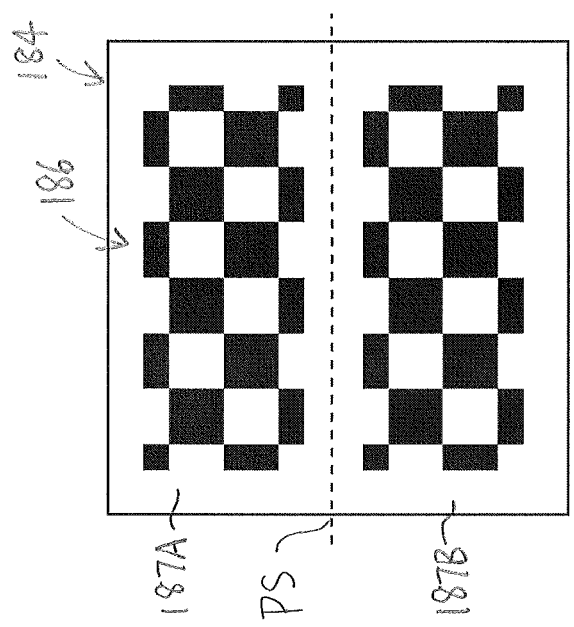
FIG. 6B is a front view of an embodiment of an optical sensor calibration plate when observed in a single optical medium, drawn at a larger scale.
Figure 6D:
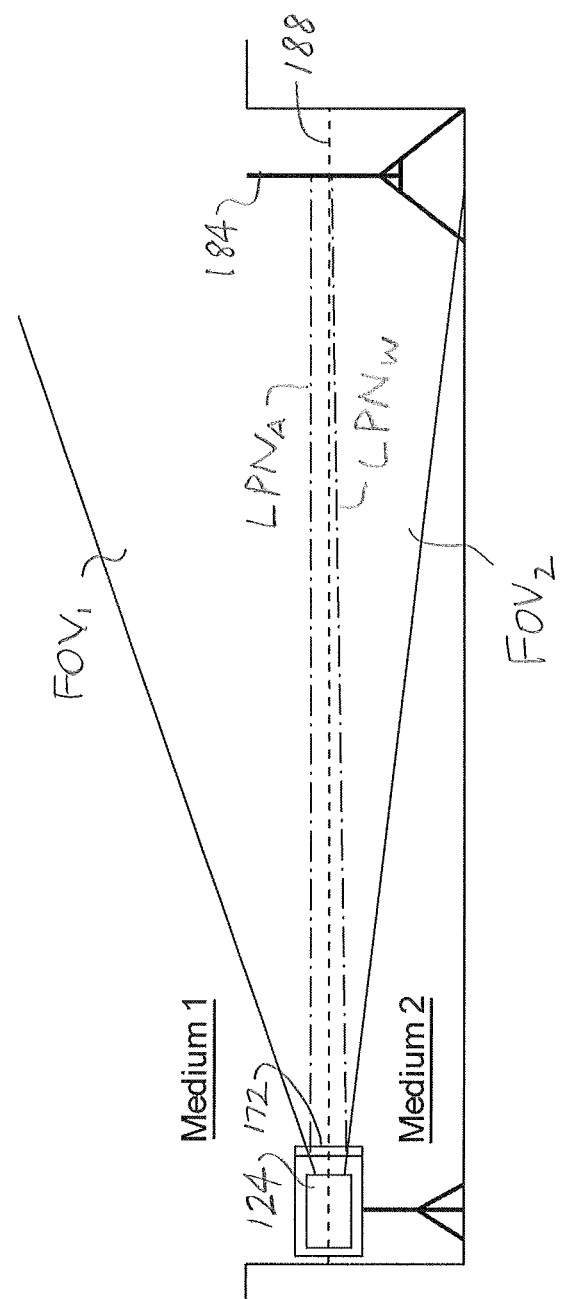
FIG. 6D is a side view of the elements of FIG. 6A.

To concurrently measure the location of the target 184 in both media of interest, the target 184 is observed simultaneously in both media (FIGS. 6A-6C). To image the symmetric target 184 in both optical media, the sensor 124 is placed at an interface 188 between the two media, with the interface 188 substantially bisecting the viewport 128. The symmetric target 184 is placed across the interface 188 between the two media such that the interface 188 bisects the target 184 substantially at the plane of symmetry "PS" and at a distance "D" (FIG. 6A) sufficient to observe the pattern 186 used to determine the location of the target 184.

For the example of an optical sensor used for a laser ranging system, FIG. 6B illustrates an example of the flat planar target 184 with the pattern 186 that may be used to calculate the plane equation in both optical media. It will be understood that the target 184 and the pattern 186 are exemplary only, and that other target and sensor configurations may be suitable. The interface 188 between the two media preferably is located substantially at the plane of symmetry "PS". The output of this stage of the calibration method of the invention is a rotation matrix and translation that can be applied to the structured signal.

This process preferably is performed at the interface 188 between the optical media with a known geometric position between the sensor and the device. Preferably, the first optical medium is air, and the second optical medium is the optical medium of interest for operation, e.g., water. This correction is demonstrated in Equation 2, where [LP$_{n1}$] is the original signal in medium 1, [RT$_{sensor}$] is the rotation/translation matrix of the sensor and [LP$_{n1}$'] is the resultant signal geometry.

$$[LP'] = [RT_{sensor}][LP_{n1}] \qquad \text{Equation 2}$$

The final stage of the calibration method of the invention involves measuring the actual angular deflection of the structured signal 121 due to refraction. In the ideal situation, there would be no (or virtually no) refraction of the signal plane 121, because the emitted signal would ideally be perpendicular to the viewport surface 174. However, as noted above, small misalignments of the signal generator 114 relative to its protective housing 116 and viewport window 118 (due to non-idealities) produce small refractive changes. To account for these small refractive shifts, the rotation of the laser plane around its refraction point 178 preferably is measured. To do this, the relative change in the angle of the signal between two different media must be measured.

Figure 7A:
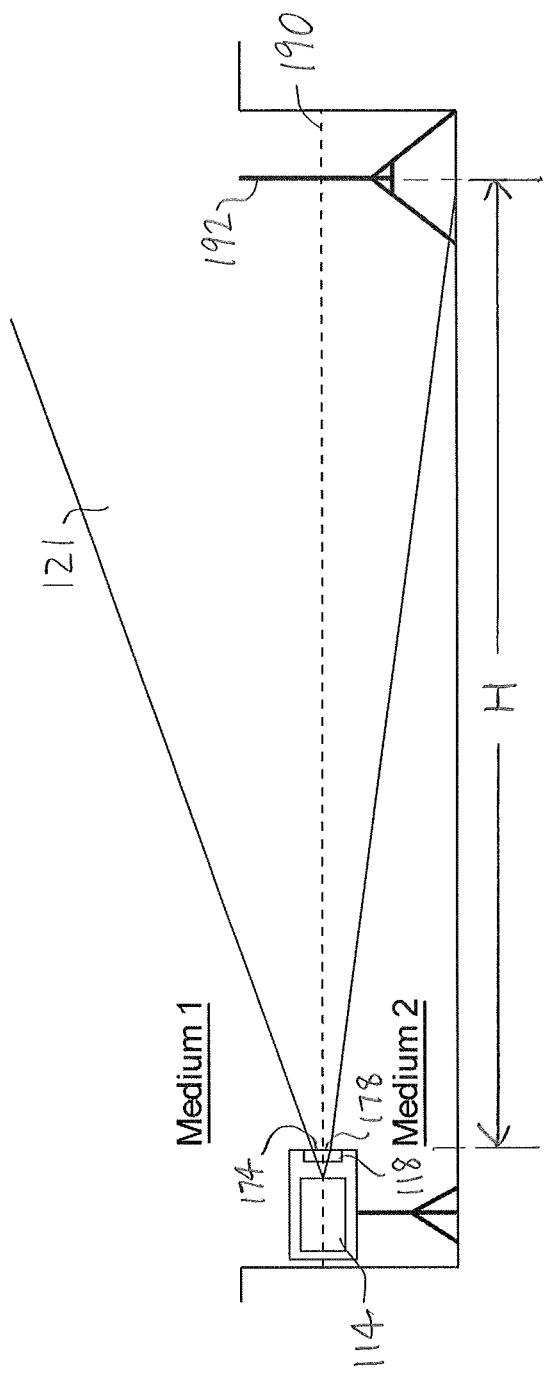
FIG. 7A is a side schematic view of an embodiment of an apparatus utilized in an embodiment of a method of the invention for measuring the rotation of a laser light plane between two optical media, drawn at a smaller scale.

The geometry of such a setup is shown in FIG. 7A. Preferably, the signal generator 114 is placed at an interface 190 between the two optical media, identified in FIG. 7A as medium 1 and medium 2. It is also preferred that the signal generator 114 is positioned such that the interface 190 between the optical media substantially bisects the viewport 118, and the generated signal 121 is oriented substantially normal to the interface 190. A substantially planar surface 192 preferably is located at the interface 190 at a distance "H" away from the viewport window 118 such that the signal 121 is projected onto the surface 192. It is also preferred that the substantially planar surface 192 has a matte finish, to minimize reflection of the signal from the surface 192.

Figure 7B:
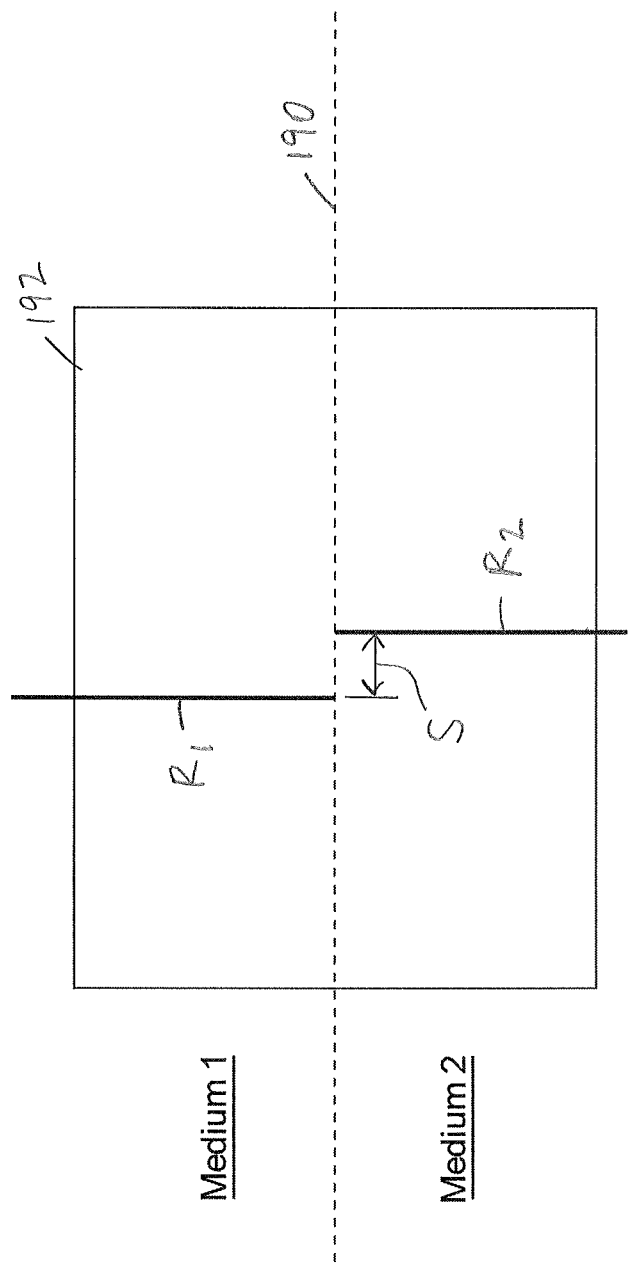
FIG. 7B is a front view of an embodiment of a substantially planar surface showing the intersection of two laser planes, separated by refraction in different optical media, and the surface.
Figure 7C:
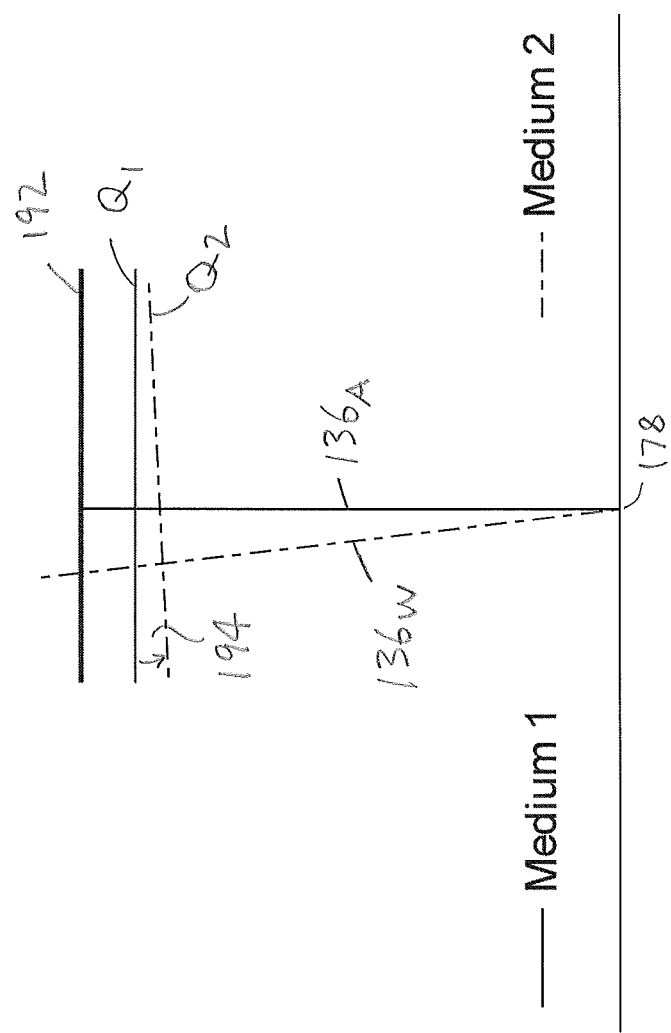
FIG. 7C is a top schematic view of the apparatus of FIG. 7A.

Specifically, for the case of the laser ranging system, the difference in the angle of laser plane normals "Q$_1$" and "Q$_2$" in air and water respectively due to refraction in the different optical media manifests as a separation of a laser line above and below the optical media interface 190. The laser plane normals "Q$_1$" and "Q$_2$" are shown in FIG. 7C. In FIG. 7C, an angular difference between the laser plane normals "Q$_1$", "Q$_2$" is identified by the reference numeral 194. The intersections of the laser plane with the surface 192 in each of medium 1 and medium 2 are designated R$_1$ and R$_2$ in medium 1 and medium 2 respectively in FIG. 7B. As can be seen in FIG. 7B, the laser planes R$_1$, R$_2$ are offset from each other at the interface 190 by a distance "S". In general, the angular difference can be calculated using the measured difference "S" in the signal and the distance "H" between the refraction point 178 at the signal emitter viewport surface 174 and the flat, matte surface 192. If the signal generator 114 must be rotated relative to its final installation orientation so that the laser plane is normal to the interface 190, then the angle 194 preferably is recorded and incorporated into the signal geometry correction. The angle 194 modifies the axis of rotation of the optical axis of the device 114. The distances "H", "S" and the angle 194 that are measured are processed to produce a rotation matrix, that can then be applied to laser plane 121. It is preferred that this process is performed at the interface 190 between the optical media with a known sensor/emitter geometric calibration (e.g., air) and the optical media of interest for operation (e.g., water). Equation 3 demonstrates the transformation of the signal geometry calculated in the second step, [LP'] into the fully corrected signal geometry for the new medium, [LP$_{n2}$] after correcting for the laser rotation [R$_{laser}$].

$$[LP_{n2}] = [R_{laser}][LP'] \qquad \text{Equation 3}$$

For a laser ranging system, the three calibration steps outlined above yield a camera matrix for the new optical media, rotation and translation parameters that correct for the perceived shift of the laser plane between optical media, and rotation parameters that correct for actual rotation of the laser plane between optical media. To transform the known calibration in one optical media into a new optical media, the original camera matrix preferably is replaced (Equation 1), and the laser plane measured in the original optical media preferably is rotated and translated into the new optical media (Equations 2 and 3). Those skilled in the art would appreciate that these rotations and translations are performed using standard algebraic techniques: for instance, generating a compound rotation/translation matrix and applying this matrix to the laser plane.

It will be understood that, although the sequence in which the steps are presented represent a logical progression of the process, it is possible for the sequence to be altered so long as the correcting rotation and transformations are performed ultimately to yield the same result mathematically.

As described above, the method of the invention of measuring changes due to refraction in the structured light ranging system makes it possible to transfer calibration performed in one optical media into a valid calibration in a new optical media. This is done by characterizing and correcting for the change in the field of view of the sensor, as well as correcting for changes due to small misalignments of the sensor and the structured light emitter with their respective housings.

As is also noted above, the method of the invention may be utilized to correct a calibration for a replacement of an individual system component. To do this, the component (i.e., the sensor assembly, or the structured light-emitting assembly, or both sequentially, as the case may be) preferably is individually calibrated using the previously described processes specific to that component in two or more media. From these individual calibrations, the initial misalignment that gives rise to the refractive differences can be measured, and compared between the two components. The signal geometry can then be translated and rotated by the differences in the misalignment between the old and new component in order to obtain an updated calibration.

It will be appreciated by those skilled in the art that the invention can take many forms, and that such forms are within the scope of the invention as claimed. The scope of the claims should not be limited by the preferred embodiments set forth in the examples, but should be given the broadest interpretation consistent with the description as a whole.

We claim:

1. A method of calibrating a trigonometric-based ranging system in air and water, the trigonometric-based ranging system comprising a structured signal-emitting device for emitting a structured signal and a sensor having a field of view for sensing signals emitted by the structured signal-emitting device, the structured signal-emitting device and the sensor having a geometric relationship measured in air, the method comprising:
   (a) in each of air and water, determining a sensor matrix for the sensor therein respectively;
   (b) measuring rotation and translation of a sensor optical axis of the sensor relative to an ideal sensor optical axis substantially defined by a sensor housing in which the sensor is mounted, by determining the rotation and translation of a sensor co-ordinate system of the sensor in each of air and water concurrently, to provide a rotation/translation matrix for the field of view in each of air and water respectively;
   (c) measuring rotation of a device optical axis of the device relative to an ideal device optical axis substantially defined by a device housing in which the device is mounted, by determining a relative change in an angle of the structured signal, between the structured signal in air and the structured signal in water respectively, to generate a device rotation matrix to be applied to the structured signal;
   (d) applying the rotation/translation matrix to the structured signal;
   (e) applying the device rotation matrix to the structured signal, to determine an apparent geometric relationship of the structured signal-emitting device and the sensor in water;
   (f) measuring rotation and translation of a new sensor optical axis of a new sensor relative to an ideal new sensor optical axis substantially defined by a new sensor housing in which the new sensor is mounted, by determining the rotation and translation of a new sensor co-ordinate system of the new sensor in each of air and water concurrently, to provide a new rotation/translation matrix for the new sensor in each of air and water respectively;
   (g) determining at least one difference between the rotation/translation matrix and the new rotation/translation matrix; and
   (h) rotating and translating the rotation/translation matrix by said at least one difference, to adjust the rotation/translation matrix for at least one discrepancy between non-idealities associated with the sensor and the sensor housing, and new non-idealities associated with the new sensor and the new sensor housing, to provide a new rotation/translation matrix for the new sensor's field of view in air and water respectively.

2. A method of calibrating a trigonometric-based ranging system in air and water, the trigonometric-based ranging system comprising a structured signal-emitting device for emitting a structured signal and a sensor having a field of view for sensing signals emitted by the structured signal-emitting device, the structured signal-emitting device and the sensor having a geometric relationship measured in air, the method comprising:
   (a) in each of air and water, determining a sensor matrix for the sensor therein respectively;
   (b) measuring rotation and translation of a sensor optical axis of the sensor relative to an ideal sensor optical axis substantially defined by a sensor housing in which the sensor is mounted, by determining the rotation and translation of a sensor co-ordinate system of the sensor in each of air and water concurrently, to provide a rotation/translation matrix for the field of view in each of air and water respectively;
   (c) measuring rotation of a device optical axis of the device relative to an ideal device optical axis substantially defined by a device housing in which the device is mounted, by determining a relative change in an angle of the structured signal, between the structured signal in air and the structured signal in water respectively, to generate a device rotation matrix to be applied to the structured signal;
   (d) applying the rotation/translation matrix to the structured signal;
   (e) applying the device rotation matrix to the structured signal, to determine an apparent geometric relationship of the structured signal-emitting device and the sensor in water;
   (f) measuring rotation of a new device optical axis of a new device generating a new structured signal relative to an ideal new device optical axis substantially defined by a new device housing in which the new device is mounted, by determining a new relative change in an angle of the new structured signal between air and water;
   (g) determining at least one device difference between the relative change and the new relative change; and
   (h) rotating the new optical axis of the new device by said at least one device difference, to adjust the device rotation matrix for at least one discrepancy between non-idealities associated with the device and the device housing and new non-idealities associated with the new device and the new device housing respectively, to generate a new rotation matrix to be applied to the new structured signal.

3. A method of calibrating a trigonometric-based ranging system comprising a structured signal-emitting assembly comprising a device for emitting at least one structured signal mounted in a device housing, the device housing substantially defining an ideal device axis, the trigonometric-based ranging system also comprising a sensor assembly comprising a sensor having at least one field of view in which said at least one structured signal is detectable by the sensor, the sensor being mounted in a sensor housing, the sensor housing substantially defining an ideal sensor axis, the structured signal-emitting device and the sensor having a geometric relationship measured in a first medium, the method comprising:
 (a) transmitting said at least one structured signal from the device via the first medium toward at least one point on a target object;
 (b) determining a first sensor matrix associated with the first medium upon the sensor sensing said at least one structured signal at said at least one point through the first medium;
 (c) transmitting said at least one structured signal from the device via a second medium toward at least one location on the target object;
 (d) determining a second camera matrix associated with the second medium upon the sensor sensing said at least one structured signal at said at least one location through the second medium;
 (e) measuring rotation and translation of a sensor axis of the sensor relative to the ideal sensor axis by measuring the rotation and translation of a sensor co-ordinate system thereof in each of the first medium and the second medium, to provide a rotation/translation matrix for said at least one field of view to adjust for non-idealities in the sensor assembly; and
 (f) measuring rotation of a device axis of the device relative to the ideal device axis by measuring a relative change in an angle between a plane defined by said at least one structured signal, between said at least one structured signal in the first medium and said at least one structured signal in the second medium respectively, to generate a device rotation matrix to be applied to said at least one structured signal to adjust for non-idealities in the structured signal-emitting assembly.

4. A method according to claim 3 comprising:
 (g) applying the rotation/translation matrix to said at least one structured signal; and
 (h) applying the device rotation matrix to said at least one structured signal,
 to determine an apparent geometric relationship of the structured signal-emitting device and the sensor in the second medium.

5. A method according to claim 3 additionally comprising:
 (g.1) measuring rotation and translation of a new sensor axis of a new sensor relative to an ideal new sensor axis substantially defined by a new sensor housing in which the new sensor is mounted, by determining the rotation and translation of a new sensor co-ordinate system of the new sensor in each of the first and the second media concurrently, to provide a new rotation/translation matrix for a new field of view of the new sensor in each of the first and the second media respectively;
 (h.1) determining at least one difference between the rotation/translation matrix and the new rotation/translation matrix; and
 (i.1) rotating and translating the rotation/translation matrix by said at least one difference, to adjust the rotation/translation matrix for at least one discrepancy between non-idealities associated with the sensor and the sensor housing, and new non-idealities associated with the new sensor and the new sensor housing, to provide a new rotation/translation matrix for the new sensor's field of view in the first and the second media respectively.

6. A method according to claim 3 additionally comprising:
 (g.2) measuring rotation of a new device axis of a new device relative to an ideal new device axis substantially defined by a new device housing in which the new device is mounted, by determining a new relative change in an angle of the new structured signal between the first and the second media, the new device generating a new structured signal;
 (h.2) determining at least one device difference between the relative change and the new relative change; and
 (i.2) rotating the new axis of the new device by said at least one device difference, to adjust the device rotation matrix for at least one discrepancy between non-idealities associated with the device and the device housing and new non-idealities associated with the new device and the new device housing, to generate a new rotation matrix to be applied to the new structured signal.

7. A method according to claim 3 in which, in step (f), the structured signal-emitting assembly is positioned at an interface between the first medium and said at least one structured signal is substantially normal to the interface, said at least one structured signal being directed toward a substantially planar surface positioned substantially normal to the interface and located at a predetermined distance from the device, to generate the device rotation matrix.

8. A method according to claim 7 in which the substantially planar surface is a flat, matte surface.

9. A method of determining rotation and translation of a co-ordinate system defined by a sensor of a trigonometric-based ranging system, the sensor being positioned in a sensor housing, the sensor housing comprising a sensor viewport through which a structured signal is transmitted to the sensor, the sensor housing substantially defining an ideal axis, the method comprising:
 (a) positioning the sensor at an interface between the first medium and the second medium, with the interface substantially bisecting the sensor viewport;
 (b) via the sensor, observing the fixed symmetric target simultaneously in each of the first medium and the second medium;
 (c) concurrently measuring a fixed symmetric target of known geometry in a first medium and in a second medium to determine apparent differences between the target in the first medium and the target in the second medium; and
 (d) determining, based on the apparent differences, rotation and translation of a co-ordinate system defined by the sensor in moving the sensor from the first medium to the second medium to provide a rotation/translation matrix applicable to the structured signal.

10. A method of determining rotation and translation of a co-ordinate system defined by a sensor of a trigonometric-based ranging system, the sensor being positioned in a sensor housing, the sensor housing comprising a sensor viewport through which a structured signal is transmitted to the sensor, the sensor housing substantially defining an ideal axis, the method comprising:
 (a) observing a fixed symmetric target simultaneously via the sensor in each of the first medium and the second medium, the fixed symmetric target comprising a substantially planar surface facing the sensor, the known geometry of the fixed symmetric target comprising a pattern symmetrically divided at a plane of symmetry, and the plane of symmetry being located substantially at the interface;

(b) concurrently measuring a fixed symmetric target of known geometry in a first medium and in a second medium to determine apparent differences between the target in the first medium and the target in the second medium; and
(c) determining, based on the apparent differences, rotation and translation of a co-ordinate system defined by the sensor in moving the sensor from the first medium to the second medium to provide a rotation/translation matrix applicable to the structured signal.

* * * * *